(12) United States Patent
Inami et al.

(10) Patent No.: US 12,291,271 B2
(45) Date of Patent: May 6, 2025

(54) ELECTRIC-VEHICLE-BODY STRUCTURE HAVING A CENTER FRAME THAT IS HIGHER THAN A FLOOR PANEL

(71) Applicant: Mazda Motor Corporation, Hiroshima (JP)

(72) Inventors: Takuma Inami, Hiroshima (JP); Nobuyuki Nakayama, Hiroshima (JP); Hiroyuki Baba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 313 days.

(21) Appl. No.: 17/940,013

(22) Filed: Sep. 8, 2022

(65) Prior Publication Data

US 2023/0103246 A1    Mar. 30, 2023

Related U.S. Application Data

(63) Continuation of application No. 17/938,966, filed on Sep. 7, 2022.

(Continued)

(30) Foreign Application Priority Data

Sep. 30, 2021 (JP) .................................. 2021-161834
Nov. 10, 2021 (JP) .................................. 2021-183238

(Continued)

(51) Int. Cl.
*B62D 21/17* (2006.01)
*B60H 1/00* (2006.01)

(Continued)

(52) U.S. Cl.
CPC ......... *B62D 21/17* (2013.01); *B60H 1/00564* (2013.01); *B62D 25/20* (2013.01);
(Continued)

(58) Field of Classification Search
CPC ........ B60K 2001/0438; B62D 25/2009; B62D 25/2018; B62D 25/2027; B62D 25/2045; B62D 21/17
(Continued)

(56) References Cited

U.S. PATENT DOCUMENTS 5,908,077 A * 6/1999 Moore ..................... B60K 6/48
                                                                180/2.2
6,270,153 B1 * 8/2001 Toyao .................... B62D 25/20
                                                                296/204

(Continued)

FOREIGN PATENT DOCUMENTS

| JP | 2005-41395 A | 2/2005 |
|---|---|---|
| JP | 2009-101815 A | 5/2009 |

(Continued)

*Primary Examiner* — Jason S Morrow
(74) *Attorney, Agent, or Firm* — XSENSUS LLP

(57) ABSTRACT

An electric-vehicle-body structure includes a floor panel constituting a floor of an occupant space, a center frame disposed to be higher than and away from the floor panel at a vehicle-width-direction central portion of the occupant space, extending in a front-rear direction, and including a bend portion at an intermediate portion, and a connecting member connecting the bend portion to the floor panel.

6 Claims, 21 Drawing Sheets

FRONT ⟵                                                                ⟶ REAR

Related U.S. Application Data

(60) Provisional application No. 63/403,872, filed on Sep. 6, 2022.

(30) Foreign Application Priority Data

| Nov. 10, 2021 | (JP) | 2021-183245 |
| Nov. 10, 2021 | (JP) | 2021-183251 |
| Nov. 10, 2021 | (JP) | 2021-183312 |
| Nov. 10, 2021 | (JP) | 2021-183323 |

(51) Int. Cl.
*B62D 25/20* (2006.01)
*B60K 1/04* (2019.01)
*B60N 2/005* (2006.01)

(52) U.S. Cl.
CPC ..... *B62D 25/2009* (2013.01); *B62D 25/2018* (2013.01); *B60K 1/04* (2013.01); *B60K 2001/0438* (2013.01); *B60N 2/005* (2013.01); *B62D 25/2045* (2013.01)

(58) Field of Classification Search
USPC ............................. 296/187.08, 208
See application file for complete search history.

(56) References Cited

U.S. PATENT DOCUMENTS

| 9,446,793 | B2* | 9/2016 | Choi | B62D 21/02 |
| 9,926,013 | B2* | 3/2018 | Ideguchi | B62D 25/2045 |
| 10,814,745 | B2* | 10/2020 | Natsume | B60K 17/04 |
| 11,008,049 | B2* | 5/2021 | Natsume | B62D 27/02 |
| 11,059,519 | B2* | 7/2021 | Persson | B62D 21/02 |
| 11,097,787 | B2* | 8/2021 | Ebisumoto | B62D 25/20 |
| 11,299,211 | B2* | 4/2022 | Matsuda | B62D 27/023 |
| 11,325,654 | B2* | 5/2022 | Ebisumoto | B62D 25/025 |
| 11,420,686 | B2* | 8/2022 | Matsuda | B62D 25/20 |
| 11,876,239 | B2* | 1/2024 | Wassmur | H01M 50/249 |
| 11,964,535 | B2* | 4/2024 | Bollinger | H01M 10/44 |
| 11,993,166 | B2* | 5/2024 | Doo | F16H 57/029 |
| 12,065,030 | B2* | 8/2024 | Kamemoto | B60K 1/04 |
| 2021/0237550 | A1* | 8/2021 | Kawase | B60L 3/0007 |
| 2023/0094186 | A1* | 3/2023 | Inami | B62D 25/2027 296/193.01 |
| 2023/0094304 | A1* | 3/2023 | Inami | B62D 21/11 180/65.1 |
| 2023/0095674 | A1* | 3/2023 | Inami | B60L 50/66 180/65.1 |
| 2023/0097913 | A1* | 3/2023 | Inami | B62D 25/20 180/65.1 |
| 2023/0100068 | A1* | 3/2023 | Inami | B60K 1/00 296/193.07 |
| 2023/0101421 | A1* | 3/2023 | Inami | B62D 25/2027 296/193.07 |
| 2023/0101665 | A1* | 3/2023 | Inami | B60H 1/00557 180/68.5 |
| 2023/0101843 | A1* | 3/2023 | Inami | B60K 1/04 296/193.07 |
| 2023/0103246 | A1* | 3/2023 | Inami | B62D 25/2018 296/204 |
| 2023/0339275 | A1* | 10/2023 | Hiramatsu | B60G 7/02 |
| 2023/0347828 | A1* | 11/2023 | Bos | B62D 25/145 |
| 2024/0181863 | A1* | 6/2024 | Kim | B60K 1/04 |

FOREIGN PATENT DOCUMENTS

| JP | 2019-123461 A | 7/2019 |
| JP | 2019-177831 A | 10/2019 |
| JP | 2021-35789 A | 3/2021 |

* cited by examiner

ELECTRIC-VEHICLE-BODY STRUCTURE HAVING A CENTER FRAME THAT IS HIGHER THAN A FLOOR PANEL

CROSS-REFERENCE TO RELATED APPLICATIONS

The present application is a continuation application of U.S. Ser. No. 17/938,966, filed on Sep. 7, 2022, which claims priority to Provisional Ser. No. 63/403,872 filed on Sep. 6, 2022, Japanese Patent Application 2021-183238, filed Nov. 10, 2021, Japanese Patent Application 2021-183245, filed Nov. 10, 2021, Japanese Patent Application 2021-183251, filed Nov. 10, 2021, Japanese Patent Application 2021-183312, filed Nov. 10, 2021, Japanese Patent Application 2021-183323, filed Nov. 10, 2021, and Japanese Patent Application 2021-161834, filed Sep. 30, 2021, the entire contents of each of which are incorporated herein by reference.

BACKGROUND

Field

The present disclosure relates to an electric-vehicle-body structure.

Description of the Related Art

A tunnel portion extending in a vehicle front-rear direction is formed at a vehicle right-left direction central portion of a floor panel of a conventional automobile. The tunnel portion is a part in which an exhaust pipe extending from an engine room on a vehicle front side to a rear portion, a propeller shaft that transfers power of an engine on the vehicle front side to rear wheels, and the like are housed, and thus largely bulges to a position higher than a bottom portion of a seat cushion.

For example, as disclosed in Patent Literature 1, left-side and right-side tunnel frames extending in the vehicle front-rear direction are provided on right and left sides, respectively, of an upper surface portion of the tunnel portion. Each tunnel frame has a cross-section opened downward, and flange portions are formed on right and left sides, respectively, of the tunnel frame. The flange portions are joined to the upper surface portion of the tunnel portion such that a closed cross-section structure extending in the vehicle front-rear direction is constituted by the tunnel portion and the tunnel frames.

CITATION LIST

Patent Literature

[Patent Literature 1] Japanese Patent Laid-open No. 2009-101815

SUMMARY

For example, in an assumed front collision, an impact load is applied from the front side of an automobile, and deformation of a vehicle cabin upon reception of the impact load needs to be suppressed as much as possible, but since the floor panel of a floor tunnel-less structure includes no tunnel frame extending in the vehicle front-rear direction, it is potentially difficult to suppress deformation of the vehicle cabin.

The present disclosure has been made in view of the above-described problem and has an objective to suppress deformation of a vehicle cabin due to an impact load from a vehicle front side in a vehicle-body structure including no floor tunnel largely bulging upward from a floor panel.

Means for Solving the Problems

To achieve the above-described objective, an electric-vehicle-body structure provided in an electric vehicle including a traveling motor and a battery unit that supplies electric power to the traveling motor may be premised in a first aspect of the present disclosure. The electric-vehicle-body structure includes a floor panel constituting a floor of an occupant space including a seat on which a passenger sits, a center frame disposed to be higher than and away from the floor panel at a vehicle-width-direction central portion of the occupant space, extending in a vehicle front-rear direction, and including, at a vehicle-front-rear-direction intermediate portion, a bend portion that bends in an up-down direction, and a connecting member extending from the bend portion toward the floor panel, having a lower portion fixed to the floor panel, and connecting the bend portion to the floor panel.

Accordingly, since the center frame higher than and away from the floor panel includes the bend portion, the center frame has a shape based on consideration of arrangement of various devices, comfortability, and the like in a vehicle cabin. In this case, the center frame is potentially more likely to deform by bending at the bend portion when an impact load is input from the vehicle front side, but with this configuration, since the bend portion of the center frame is connected to the floor panel by the connecting member, the bending of the center frame can be suppressed. Accordingly, the impact load can be efficiently transferred to the vehicle rear side of the bend portion of the center frame.

The center frame according to a second aspect of the present disclosure includes a front-side frame member extending in the vehicle front-rear direction, and a rear-side frame member disposed on a vehicle rear side of the front-side frame member and extending toward a vehicle rear side at a tilt angle different from a tilt angle of the front-side frame member. The bend portion is constituted by a connection part between the front-side frame member and the rear-side frame member.

With this configuration, since the front-side frame member and the rear-side frame member extending in the vehicle front-rear direction are connected, the bend portion having an optional angle based on consideration of arrangement of various devices, comfortability, and the like in the vehicle cabin can be relatively easily formed. The tilt angle of the front-side frame member may be larger or smaller than the tilt angle of the rear-side frame member. Moreover, the tilt angle of one of the front-side frame member and the rear-side frame member may be 0°, in other words, may be horizontal in the vehicle front-rear direction.

The center frame according to a third aspect of the present disclosure includes a connection member connecting a rear portion of the front-side frame member and a front portion of the rear-side frame member. An upper portion of the connecting member is fixed to the connection member.

With this configuration, since the connection member is disposed in a manner corresponding to the bend portion of the center frame, the bend portion can be reliably connected to the floor panel by connecting the connection member to the floor panel.

In a fourth aspect of the present disclosure, the front-side frame member and the rear-side frame member have tubular shapes extending in the vehicle front-rear direction. The connection member has a tubular shape connecting the rear portion of the front-side frame member and the front portion of the rear-side frame member to allow communication between the portions.

With this configuration, since the entire center frame including the connection member has a hollow structure, the center frame has a light weight and a high stiffness.

In a fifth aspect of the present disclosure, the rear portion of the front-side frame member and the front portion of the rear-side frame member are connected in a state of being inserted in the connection member.

With this configuration, it is possible to restrict relative displacement of the front-side frame member and the rear-side frame member relative to the connection member in the up-down direction and the vehicle width direction, thereby increasing the stiffness of the center frame constituted by a plurality of members.

In a sixth aspect of the present disclosure, the bend portion bends downward, and the connection member includes an upper wall portion and a lower wall portion extending in a vehicle width direction. A dimension of the lower wall portion of the connection member in the vehicle front-rear direction is set to be longer than a dimension of the upper wall portion of the connection member in the vehicle front-rear direction, and the upper portion of the connecting member is fixed to the lower wall portion of the connection member.

Accordingly, since the bend portion bends downward, the dimension of the lower wall portion of the connection member in the vehicle front-rear direction, which is arranged in a manner corresponding to the bend portion, is longer than the dimension of the upper wall portion thereof. Since the upper portion of the connecting member is fixed to the lower wall portion having the longer dimension in the vehicle front-rear direction, it is possible to provide a large fixation range for the connecting member, and as a result, increase the fixation strength of the connecting member.

In a seventh aspect of the present disclosure, an air-conditioning device that generates air-conditioned air is further included. The air-conditioned air generated by the air-conditioning device is introduced to the front-side frame member. The rear-side frame member is provided with a vent portion for air-conditioned air circulating inside the rear-side frame member.

With this configuration, since the air-conditioned air can be transferred to a desired place in the occupant space by using the center frame, the size of the occupant space can be increased as compared to a configuration in which an air-conditioning duct is separately provided.

Advantages

As described above, bending of a center frame can be suppressed so that an impact load from the vehicle front side is efficiently transferred to the vehicle rear side of a bend portion of the center frame, and thus deformation of a vehicle cabin due to an impact load in the vehicle front-rear direction can be suppressed even with a vehicle-body structure including a floor panel including no floor tunnel largely bulging upward from the floor panel.

BRIEF DESCRIPTION OF THE DRAWINGS

The scope of the present disclosure is best understood from the following detailed description of exemplary embodiments when read in conjunction with the accompanying drawings.

DETAILED DESCRIPTION

Non-limiting embodiments of the present disclosure will be described below in detail with reference to the accompanying drawings. The following description of the preferable embodiment is merely exemplary in essence and not intended to limit the present disclosure, its application, nor its usage.

Figure 1:
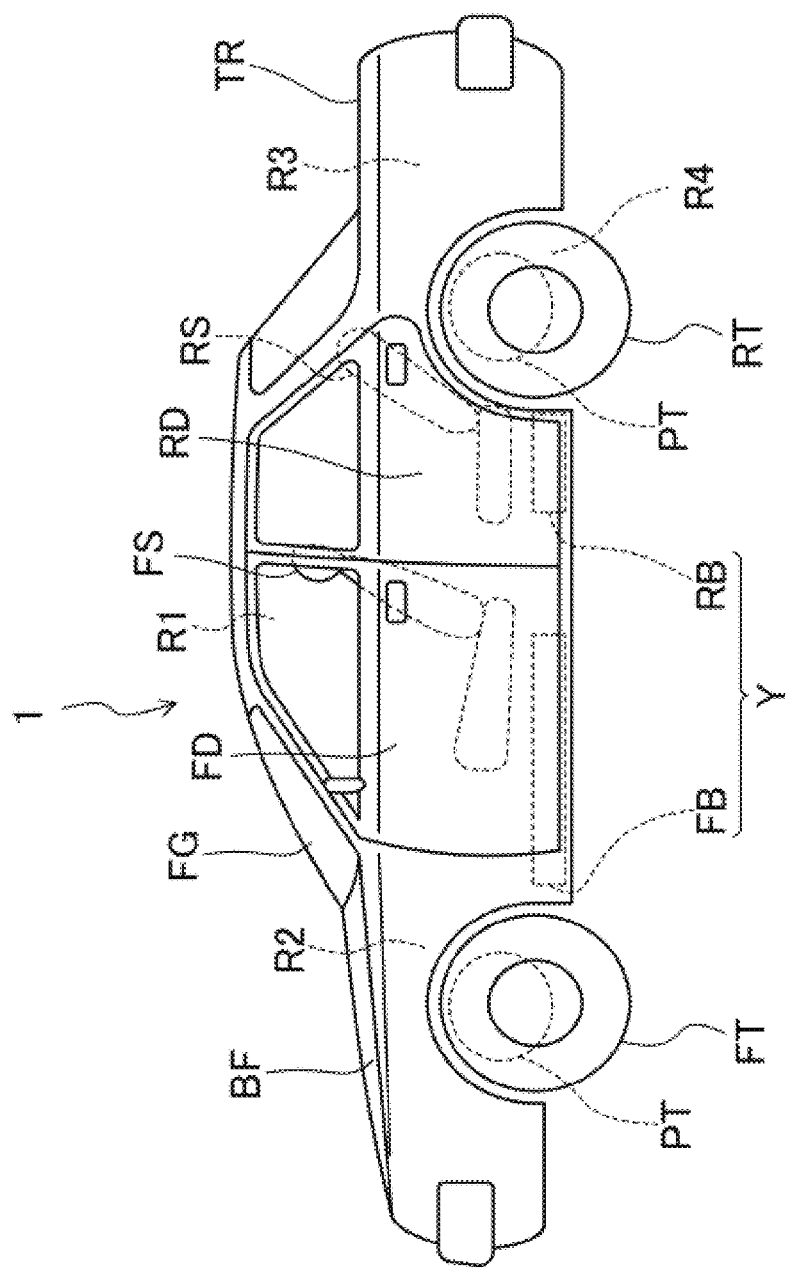
FIG. 1 is a side view of an automobile having a vehicle-body structure according to an embodiment of the present disclosure.

FIG. 1 is a side view of an automobile 1 including a vehicle-body structure A according to a non-limiting embodiment of the present disclosure when viewed from left. In description of the non-limiting embodiment, a vehicle front-rear direction is simply referred to as a "front-rear direction", a vehicle front side is simply referred to as a "front side", and a vehicle "rear side" is simply referred to as rear side. In addition, a vehicle width direction is the right-left direction of the vehicle, a vehicle left side is simply referred to as a "left side", and a vehicle right side is simply referred to as a "right side".

(Entire Structure of Automobile)

The automobile 1 is a passenger automobile, and an occupant space R1 in which a passenger boards is provided at a front-rear direction intermediate portion of the automobile 1. The occupant space R1 includes front seats (front-row seats) FS included in a front row, and rear seats (rear-row seats) RS included in a rear row. The front seats FS include a driver seat arranged on the right side (or the left side) in the occupant space R1, and a front passenger seat arranged on the left side (or the right side) in the occupant space R1. The rear seats RS are arranged on the right and left sides, respectively, in the occupant space R1. Third-row seats may be arranged on the rear side of the rear seats RS. The rear seats RS are not essential and may be omitted.

A front door FD and a rear door RD are disposed on each of the left and right sides of the occupant space R1. The rear door RD may be omitted in a case of the automobile 1 including no rear seats RS.

A front-side space R2 is provided on the front side of the occupant space R1 in the automobile 1. A powertrain PT can be mounted in the front-side space R2 as necessary. When the powertrain PT is mounted in the front-side space R2, the front-side space R2 may be called, for example, a powertrain storage room, a motor room, or an engine room. A bonnet hood BF is provided at an upper portion of the front-side space R2.

A trunk space R3 in which a package or the like can be housed is provided on the rear side of the occupant space R1 in the automobile 1. The trunk space R3 can be opened and closed by a trunk lid TR. A rear-side space R4 is provided on the rear side of the occupant space R1 and at a position lower than the trunk space R3 in the automobile 1. The powertrain PT that generates power for the automobile 1 can be mounted in the rear-side space R4 as necessary. When the powertrain PT is mounted in the rear-side space R4, the rear-side space R4 may be called, for example, a powertrain storage room, a motor room, or an engine room.

The powertrain PT may be mounted in each of the front-side space R2 and the rear-side space R4 or the powertrain PT may be mounted in one of them. A front-wheel-drive vehicle in which only front wheels FT are driven by the powertrain PT is achieved when the powertrain PT is mounted only in the front-side space R2, or a rear-wheel-drive vehicle in which only rear wheels RT are driven by the powertrain PT is achieved when the powertrain PT is mounted only in the rear-side space R4. Alternatively, a four-wheel-drive vehicle is achieved when the front wheels FT and the rear wheels RT are driven by the powertrains PT mounted in both the front-side space R2 and the rear-side space R4.

Each powertrain PT includes at least a traveling motor M (illustrated in FIG. 2) for driving a drive wheel and also includes a speed reducer, a transmission, or the like as necessary. Thus, the automobile 1 is an electric vehicle. The traveling motor M is disposed such that the rotation center thereof extends in the right-left direction. The powertrain PT may include, for example, a controller in addition to the traveling motor M. The powertrain PT may include an internal combustion engine. A battery unit Y (also illustrated in FIG. 1) for supplying electric power to the traveling motor M is mounted at a lower portion of the automobile 1. For example, the battery unit Y may be charged by using power generated by the internal combustion engine, and either the front wheels FT or the rear wheels RT or both may be driven by power generated by the internal combustion engine.

The type of the automobile 1 does not necessarily need to be a four-door vehicle as exemplarily illustrated in FIG. 1 and may be, for example, an automobile including no rear doors RD. The present disclosure is also applicable to an automobile, such as a hatchback vehicle, in which the rear-side space R4 can be opened and closed by a tail gate.

Figure 2:
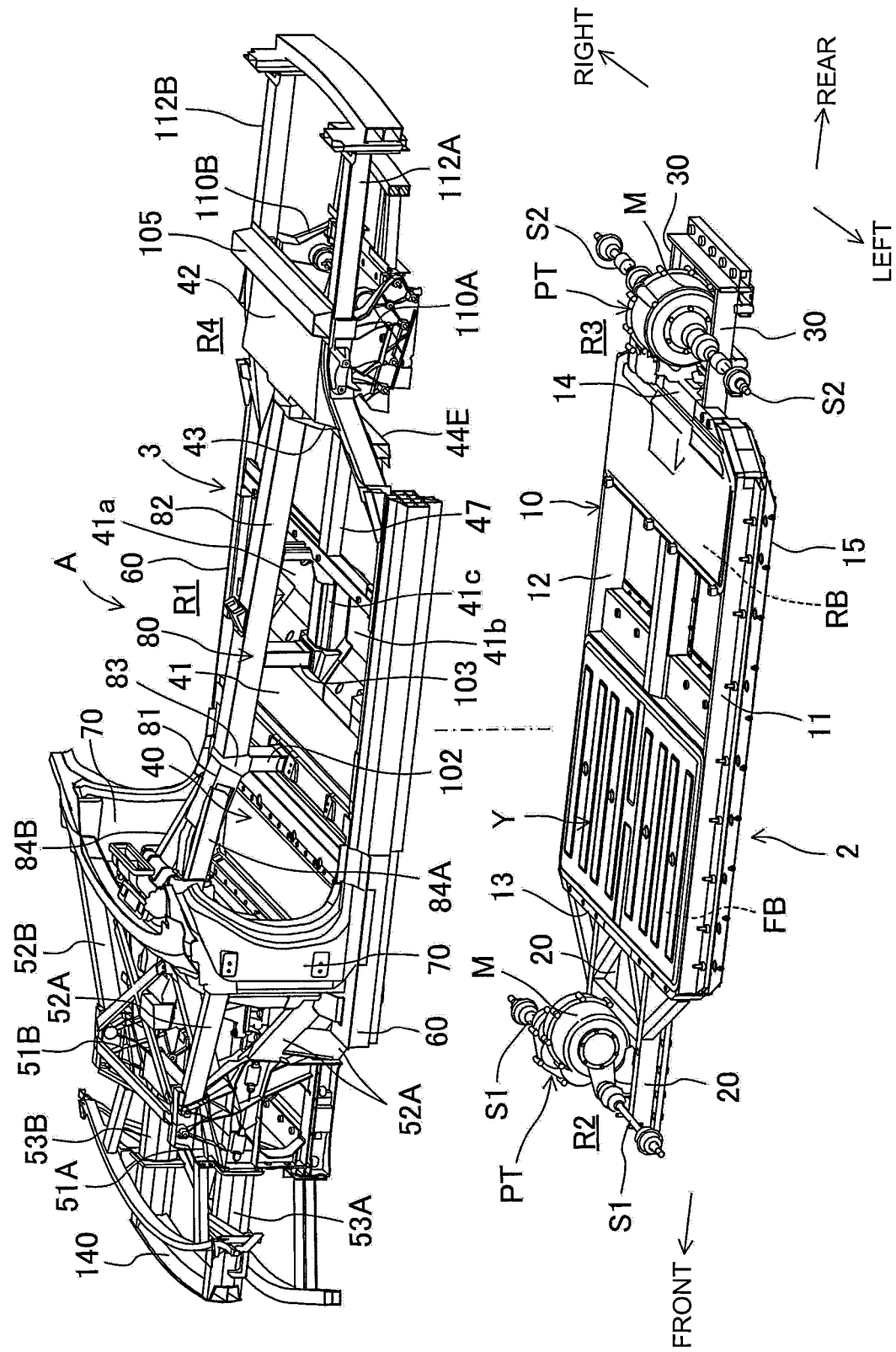
FIG. 2 is a perspective view illustrating a state in which the automobile is divided into an upper-portion structural body and a lower-portion structural body.

As illustrated in FIG. 2, the automobile 1 includes a lower-portion structural body 2 and an upper-portion structural body 3, and the vehicle-body structure A is constituted by the lower-portion structural body 2 and the upper-portion structural body 3. FIG. 2 illustrates a state in which the doors FD and RD, the bonnet hood BF, a fender, window glasses, a roof, a center pillar, a rear pillar, a bumper, front and rear lighting devices, an instrument panel, the front and rear seats, and the like, which are included in the upper-portion structural body 3 in reality, are removed. FIG. 2 also illustrates a state in which the front wheels FT, the rear wheels RT, a suspension device, and the like, which are included in the lower-portion structural body 2 in reality, are removed.

The lower-portion structural body 2 includes the battery unit Y. The battery unit Y includes a front-side battery FB, a rear-side battery RB, and a rack frame 10 surrounding the front-side battery FB and the rear-side battery RB. The lower-portion structural body 2 also includes a front support frame 20 extending from a front portion of the rack frame 10 toward the front side, and a rear support frame 30 extending from a rear portion of the rack frame 10 toward the rear side.

In a typical electric automobile, a battery unit is often detachably attached as a separated body from a vehicle body under a floor, but in the present embodiment, not only the batteries FB and RB but also the front support frame 20 and the rear support frame 30 are integrated with the rack frame 10 surrounding the batteries FB and RB, and the front support frame 20 and the rear support frame 30 are detachably attached to the upper-portion structural body 3 together with the batteries FB and RB.

Specifically, the automobile 1 of the present embodiment is configured to be able to be divided in the up-down direction into the lower-portion structural body 2 including the batteries FB and RB, and the upper-portion structural body 3 in which the occupant space R1 and the trunk space R3 are formed. Being able to be divided in the up-down direction means integration of the lower-portion structural body 2 with the upper-portion structural body 3 by using fastening members such as bolts and nuts, screws, and the like without using welding, bonding, and the like. Accordingly, the lower-portion structural body 2 can be separated from the upper-portion structural body 3 as necessary when maintenance and repair are performed after the automobile 1 is handed over to a user, and thus maintainability is excellent.

A vehicle-body structure of a ladder frame type is known as the vehicle-body structure of an automobile. In a case of the vehicle-body structure of the ladder frame type, division into a ladder frame and a cabin in the up-down direction is possible, but the ladder frame continuously extends in the front-rear direction and thus mainly receives a collision load at front collision and rear collision. At side collision, the ladder frame only supplementarily receives a collision load, and the collision load is mainly received by the cabin. In this manner, in the vehicle-body structure of the ladder frame type, it is normal that a member that receives a collision load is different between front or rear collision and side collision.

However, in a case of the automobile 1 of the present embodiment, the lower-portion structural body 2, which includes the front support frame 20 and the rear support frame 30, and the upper-portion structural body 3 can be divided from each other, but its technical idea is largely different from that of the conventional vehicle-body structure of the ladder frame type in that a collision load is received by the lower-portion structural body 2 and the upper-portion structural body 3 in both cases of front or rear collision and side collision and thus the collision load can be dispersed to and absorbed by the structural bodies 2 and 3. Hereinafter, the structures of the lower-portion structural body 2 and the upper-portion structural body 3 will be sequentially described.

(Lower-Portion Structural Body)

First, the lower-portion structural body 2 will be described below. The lower-portion structural body 2 includes the powertrain PT, the front wheels FT, the rear wheels RT, and front-side suspension devices SP1 and SP2 and rear-side suspension devices SP3 and SP4, which are illustrated with virtual lines in FIG. 4, in addition to the batteries FB and RB, the rack frame 10, the front support frame 20, and the rear support frame 30. The formats of the front-side suspension devices SP1 and SP2 and the rear-side suspension devices SP3 and SP4 are not particularly limited, and the vehicle-body structure may be changed in accordance with the formats of the front-side suspension devices SP1 and SP2 and the rear-side suspension devices SP3 and SP4.

As illustrated in FIG. 2, the rack frame 10 as a framework of the battery unit Y is a member for surrounding and protecting the front-side battery FB, the rear-side battery RB, harnesses, and the like. The rack frame 10 is formed in such a large size that, on the lower side of an occupant-space-side floor panel 41 to be described later, the rack frame 10 extends from the vicinity of a left end portion of the occupant-space-side floor panel 41 to the vicinity of a right end portion thereof and extends from the vicinity of a front end portion of the occupant-space-side floor panel 41 to the vicinity of a rear end portion thereof. In this manner, since the rack frame 10 is provided in a large part of a region on the lower side of the occupant-space-side floor panel 41, the batteries FB and RB having large capacities can be mounted on the automobile 1. The batteries FB and RB may be, for example, lithium-ion batteries or all-solid-state batteries or may be any other secondary batteries. Alternatively, the batteries FB and RB may be what is called battery cells or may be battery packs in which a plurality of battery cells are housed.

The rack frame 10 includes a left side member 11, a right side member 12, a front-side member 13, and a rear-side member 14. The left side member 11, the right side member 12, the front-side member 13, and the rear-side member 14 are formed of, for example, an extruded material made of an aluminum alloy, but may be formed of a press-formed material such as an aluminum alloy plate material or a steel plate. In description below, an "extruded material" is an extruded material made of an aluminum alloy, and a "press-formed material" is a press-formed material such as an aluminum alloy plate material or a steel plate. Alternatively, each member may be formed of, for example, cast metal or die cast.

A cross-sectional shape of each of the left side member 11, the right side member 12, the front-side member 13, and the rear-side member 14 in a direction orthogonal to its longitudinal direction is a rectangular shape. The left side member 11, the right side member 12, the front-side member 13, and the rear-side member 14 are all arranged at the same height and substantially horizontally extend. When the lower-portion structural body 2 is to be connected to the upper-portion structural body 3, the front-side member 13 is fastened and fixed to a lower portion of a dash panel 50 by a fastening member, and the left side member 11 and the right side member 12 are fastened and fixed to right and left side sills 60, respectively, by fastening members. The rear-side member 14 is fastened and fixed to a connection panel 43, which will be described later, by a fastening member.

The left side member 11 is provided at a left end portion of the lower-portion structural body 2 and extends in the front-rear direction. The right side member 12 is provided at a right end portion of the lower-portion structural body 2 and extends in the front-rear direction. The left side member 11 and the right side member 12 are arranged on a vehicle-width-direction inner side of the right and left side sills 60, respectively, to be described later. The front-side member 13 is provided at a front portion of the battery unit Y and extends in the right-left direction from a front end portion of the left side member 11 to a front end portion of the right side member 12. A left end portion of the front-side member 13 and the front end portion of the left side member 11 are connected to each other, and a right end portion of the front-side member 13 and the front end portion of the right side member 12 are connected to each other. The rear-side member 14 is provided at a rear portion of the battery unit Y and extends in the right-left direction from a rear end portion of the left side member 11 to a rear end portion of the right side member 12. A left end portion of the rear-side member 14 and the rear end portion of the left side member 11 are connected to each other, and a right end portion of the rear-side member 14 and the rear end portion of the right side member 12 are connected to each other.

A cover member 15 as a bottom plate is attached to a lower portion of the rack frame 10. The rack frame 10 is blocked from the lower side by the cover member 15. The cover member 15 substantially horizontally extends and is fixed to lower surfaces of the left side member 11, the right side member 12, the front-side member 13, and the rear-side member 14 and also fixed to the side sills 60 as described later. Note that an upper portion of the rack frame 10 may be blocked by a lid or may be blocked by the occupant-space-side floor panel 41 to be described later. Note that electric power of the batteries FB and RB housed in the rack frame 10 is supplied to the traveling motor M through a traveling control circuit. The batteries FB and RB can be charged through a charging socket.

Figure 5:
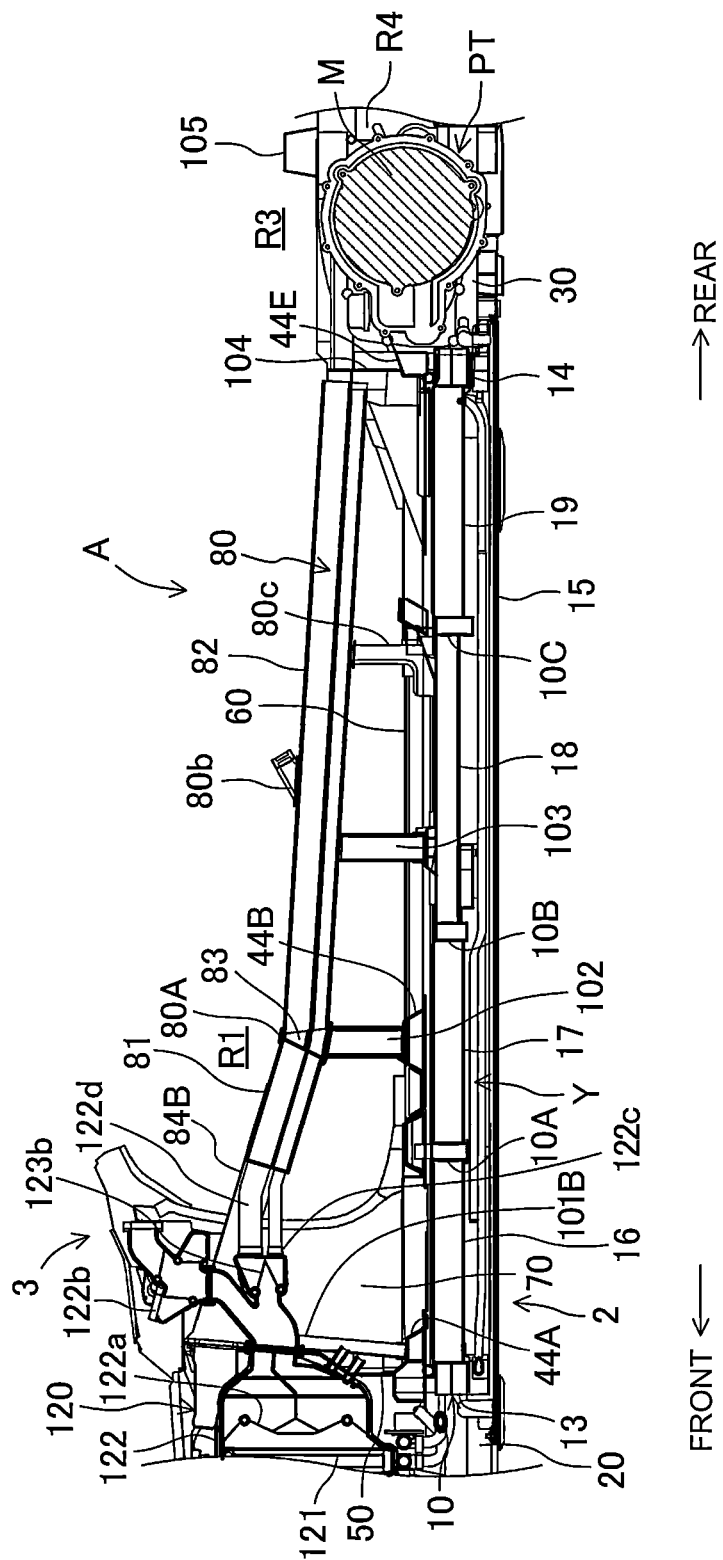
FIG. 5 is a cross-sectional diagram along line V-V in FIG. 4.

FIG. 5 illustrates a cross-section of a right-left direction central portion of the vehicle-body structure A. As illustrated in FIG. 5, first to third battery-side cross members 10A, 10B, and 10C as reinforcement members extending in the right-left direction are provided inside the rack frame 10. The heights of the first to third battery-side cross members 10A, 10B, and 10C are all the same and are the same as the heights of the front-side member 13 and the rear-side member 14. The first to third battery-side cross members 10A, 10B, and 10C may be formed of extruded materials or may be formed of press-formed materials. In the present embodiment, the three battery-side cross members 10A, 10B, and 10C are provided, but the number of the battery-side cross members 10A, 10B, and 10C may be increased or decreased in accordance with dimensions of the rack frame 10 in the front-rear direction.

The first to third battery-side cross members 10A, 10B, and 10C are arranged at an interval from each other in the front-rear direction, the first battery-side cross member 10A is positioned farthest on the front side, and the third battery-side cross member 10C is positioned farthest on the rear side. Lower portions of the battery-side cross members 10A, 10B, and 10C are fixed to an upper surface of the cover member 15. Left end portions of the battery-side cross members 10A, 10B, and 10C are fixed to an inner surface (right-side surface) of the left side member 11, and right end portions of the battery-side cross members 10A, 10B, and 10C are fixed to an inner surface (left-side surface) of the right side member 12. In other words, the battery-side cross members 10A, 10B, and 10C are members connecting the left side member 11 and the right side member 12.

A front-portion central member 16 and first to third rear-portion central members 17 to 19 as reinforcement members extending in the front-rear direction are provided inside the rack frame 10. The front-portion central member 16 and the first to third rear-portion central members 17 to 19 may be referred to as a battery frame extending in the front-rear direction, and the battery unit Y has a structure including the battery frame constituted by the front-portion central member 16, the first to third rear-portion central members 17 to 19, and the like. The left side member 11, the right side member 12, the front-side member 13, and the rear-side member 14 may be included in the battery frame.

The front-portion central member 16 and the first to third rear-portion central members 17 to 19 are arranged at substantially same heights and provided at a right-left direction center of the rack frame 10. Lower end portions of the front-portion central member 16 and the first to third rear-portion central members 17 to 19 are attached to the upper surface of the cover member 15. The front-portion central member 16 and the first to third rear-portion central members 17 to 19 extend from the front-side member 13 to the rear-side member 14.

The front-portion central member 16 is arranged between the front-side member 13 and the first battery-side cross member 10A, a front end portion of the front-portion central member 16 is fixed to a right-left direction central portion of the front-side member 13, and a rear end portion of the front-portion central member 16 is fixed to a right-left direction central portion of the first battery-side cross member 10A. Accordingly, the front-side member 13 is a member extending to connect the front end portions of the left side member 11 and the right side member 12 to the front end portion of the front-portion central member 16.

The first rear-portion central member 17 is arranged between the first battery-side cross member 10A and the second battery-side cross member 10B, a front end portion of the first rear-portion central member 17 is fixed to the right-left direction central portion of the first battery-side cross member 10A, and a rear end portion of the first rear-portion central member 17 is fixed to a right-left direction central portion of the second battery-side cross member 10B. The second rear-portion central member 18 is arranged between the second battery-side cross member 10B and the third battery-side cross member 10C, a front end portion of the second rear-portion central member 18 is fixed to the right-left direction central portion of the second battery-side cross member 10B, and a rear end portion of the second rear-portion central member 18 is fixed to a right-left direction central portion of the third battery-side cross member 10C. The third rear-portion central member 19 is arranged between the third battery-side cross member 10C and the rear-side member 14, a front end portion of the third rear-portion central member 19 is fixed to the right-left direction central portion of the third battery-side cross member 10C, and a rear end portion of the third rear-portion central member 19 is fixed to a right-left direction central portion of the rear-side member 14. Accordingly, the first to third battery-side cross members 10A, 10B, and 10C and the front-portion central member 16 and the first to third rear-portion central members 17 to 19 are disposed in a lattice shape and connected to each other inside the rack frame 10, which further increases the effect of reinforcing the rack frame 10 and thus the effect of reinforcing the lower-portion structural body 2.

When a virtual straight line extending in the front-rear direction in a plan view is assumed, the positions of the front-portion central member 16 and the first to third rear-portion central members 17 to 19 in the right-left direction are set such that the members are arranged on the virtual line. In other words, the members are provided such that the first to third rear-portion central members 17 to 19 are positioned on a virtual extended line from the front-portion central member 16 on the rear side. Note that the front-portion central member 16 and the first to third rear-portion central members 17 to 19 may be formed as one member that is continuous in the front-rear direction. In this case, the one member extends from the front-side member 13 to the rear-side member 14.

As illustrated in FIG. 2, a pair of right and left front support frames 20 are provided and substantially horizontally extend in straight lines on the lower side of the upper-portion structural body 3. Each front support frame 20 may be formed of, for example, an extruded material or a press-formed material. In the present embodiment, each front support frame 20 is formed of an extruded material, and thus a cross-sectional shape thereof in a direction orthogonal to the front-rear direction is substantially constant from a front end portion to a rear end portion.

The left-side front support frame 20 is connected to a site on the left side of a right-left direction center of the front-side member 13 constituting the front portion of the rack frame 10, and this connection site is positioned on the right side of the left side member 11 of the rack frame 10. The right-side front support frame 20 is connected to a site on the right side of the right-left direction center of the front-side member 13, and this connection site is positioned on the left side of the right side member 12 of the rack frame 10. The heights of the right and left front support frames 20 are substantially the same.

The front-side powertrain PT is attached to each front support frame 20 through a mounting member. In this case, the front support frame 20 serves as a front-side motor support frame that supports the traveling motor M on the front side of the battery unit Y. In the lower-portion structural body 2, drive shafts S1 through which output from the powertrain PT (rotational force of the traveling motor M) is transferred to the right and left front wheels FT, respectively, are provided on the right and left sides.

Figure 4:
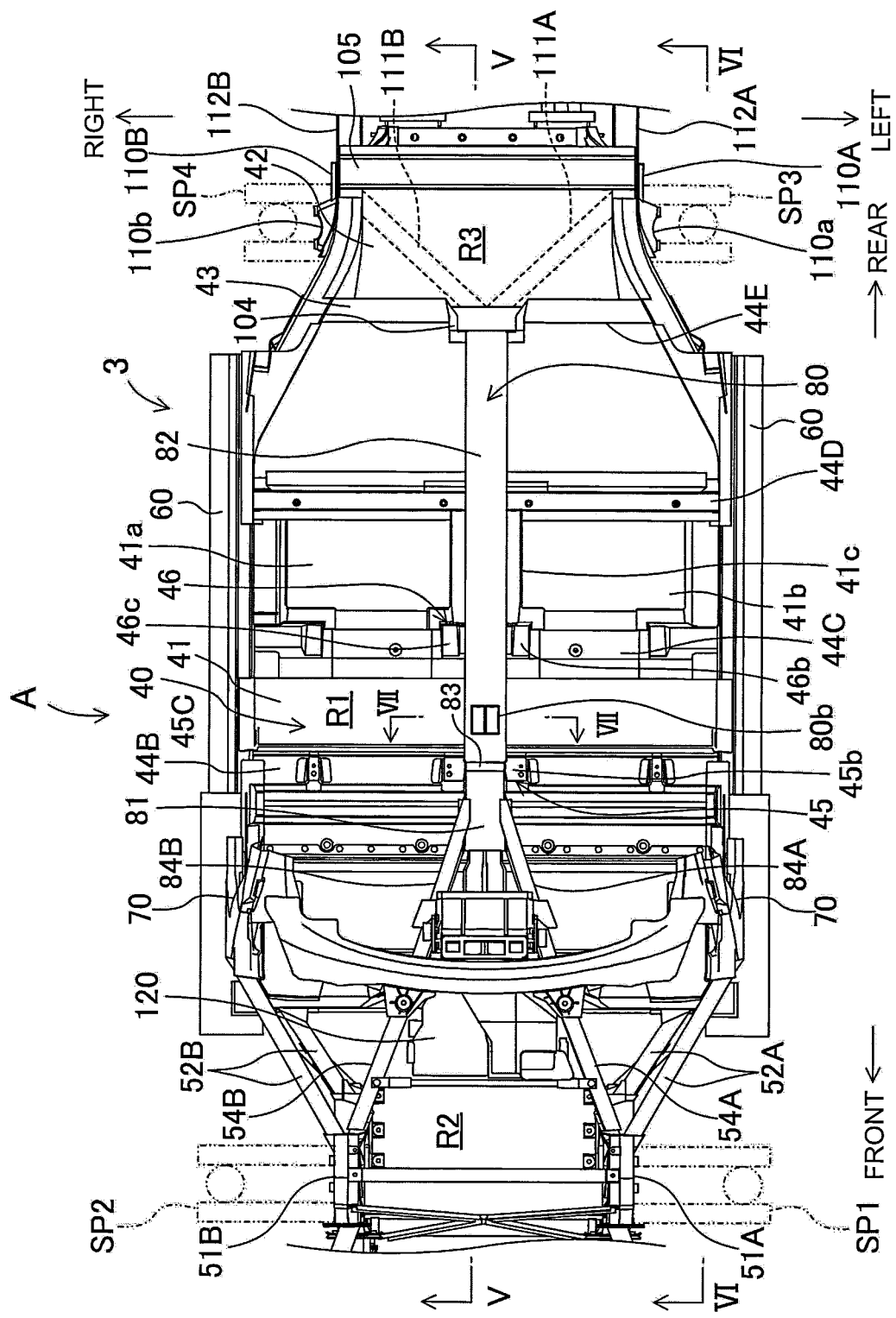
FIG. 4 is a plan view of part of the vehicle-body structure.

Right and left suspension arms constituting parts of the front-side suspension devices SP1 and SP2 illustrated with virtual lines in FIG. 4 are freely swingably supported to the right and left front support frames 20, respectively, in the up-down direction. The front support frames 20 may be members for supporting the suspension arms without supporting the powertrain PT.

As illustrated in FIG. 2, similarly to the front support frames 20, a pair of right and left rear support frames 30 are provided and substantially horizontally extend in straight lines toward the rear side. Each rear support frame 30 may be formed of, for example, an extruded material or a press-formed material. In the present embodiment each rear support frame 30 is formed of an extruded material.

The left-side rear support frame 30 is connected to a site on the left side of a right-left direction center of the rear-side member 14 constituting the rear portion of the rack frame 10, and this connection site is positioned on the right side of the left side member 11 of the rack frame 10. The right-side rear support frame 30 is connected to a site on the right side of the right-left direction center of the rear-side member 14, and this connection site is positioned on the left side of the right side member 12 of the rack frame 10.

The rear-side powertrain PT is attached to each rear support frame 30 through a mounting member. In this case, the rear support frame 30 serves as a rear-side motor support frame that supports the rear-side traveling motor M of the battery unit Y. In the lower-portion structural body 2, drive shafts S2 through which output from the powertrain PT (rotational force of the traveling motor M) is transferred to the right and left rear wheels, respectively, are provided on the right and left sides.

Right and left suspension arms constituting parts of the rear-side suspension devices SP3 and SP4 illustrated with virtual lines in FIG. 4 are freely swingably supported to the right and left rear support frames 30, respectively, in the up-down direction. The rear support frames 30 may be members for supporting the suspension arms without supporting the powertrain PT.

(Upper-Portion Structural Body)

Subsequently, the upper-portion structural body 3 will be described below. The upper-portion structural body 3 includes a floor member 40, the dash panel 50, and the pair of right and left side sills 60. The floor member 40 is a member at a higher position than the rack frame 10 and the rear support frames 30 of the lower-portion structural body 2. The floor member 40 includes the occupant-space-side floor panel (first floor panel) 41 constituting a floor of the occupant space R1 including the front seats FS and the rear seats RS (illustrated in FIG. 1) on which passengers sits, a trunk-space-side floor panel (second floor panel) 42 constituting a floor of the trunk space R3, and the connection panel 43 connecting a rear portion of the occupant-space-side floor panel 41 and a front portion of the trunk-space-side floor panel 42. A kick-up portion is constituted by the connection panel 43.

The floor member 40 may be formed of, for example, a member shaped by pressing a steel plate or the like. The occupant-space-side floor panel 41, the trunk-space-side floor panel 42, and the connection panel 43 may be integrally formed or may be formed by separately forming components and then connecting them. In the present embodiment, description is made with the three divided portions of the occupant-space-side floor panel 41, the trunk-space-side floor panel 42, and the connection panel 43, but the floor member 40 including the panels 41 to 43 may be referred to as a floor panel. Alternatively, only the occupant-space-side floor panel 41 may be referred to as a floor panel.

The occupant-space-side floor panel 41 extends from a front portion of the occupant space R1 to a rear portion thereof and from a left-side portion of the occupant space R1 to a right-side portion thereof. The occupant-space-side floor panel 41 according to the present embodiment has a floor tunnel-less structure including no tunnel portion. Specifically, a vehicle-width-direction central portion of a floor panel of a conventional automobile is typically provided with a tunnel portion largely bulging upward and extending in the front-rear direction. The tunnel portion is a part for allowing, for example, insertion of an exhaust pipe extending toward the rear side from an engine mounted in an engine room at a vehicle front portion and insertion of a propeller shaft through which output from the engine mounted in the engine room at the vehicle front portion is transferred to rear wheels. The diameters of the exhaust pipe and the propeller shaft are often, for example, equal to or larger than 10 cm, and furthermore, a gap of at least several centimeters or larger needs to be provided between each of the exhaust pipe and the propeller shaft and the floor panel to prevent interference of the exhaust pipe or the propeller shaft with the floor panel. In addition, for example, an insulator is disposed on an inner surface of the tunnel portion in some cases. With these factors, the height of bulging of the tunnel portion from the floor panel is, for example, equal to or larger than 15 cm or equal to or larger than 20 cm in some cases, and as for a positional relation with a seat, an upper end of the tunnel portion is higher than a lower end of a seat cushion on a seat rail or an up-down direction central portion of the seat cushion. A structure without such a tunnel portion largely bulging upward is a tunnel-less structure.

The occupant-space-side floor panel 41 includes no tunnel portion having a height equal to or larger than 15 cm or equal to or larger than 20 cm from an upper surface of the occupant-space-side floor panel 41 as described above, but may include, for example, a bulging portion having a low height equal to or smaller than 5 cm or equal to or smaller than 10 cm from the upper surface of the occupant-space-side floor panel 41. In a case of such a bulging portion having a low height, neither exhaust pipe nor a propeller shaft can be inserted inside the bulging portion, and thus the bulging portion does not function as a tunnel portion. Thus, the occupant-space-side floor panel 41, which includes a bulging portion having a low height equal to or smaller than 5 cm or equal to or smaller than 10 cm from the upper surface of the occupant-space-side floor panel 41, is a floor panel of a tunnel-less structure. In addition, the occupant-space-side floor panel 41 may be provided with, for example, a rib protruding upward and extending in the front-rear direction. The height of such a rib is several centimeters approximately, and thus the floor panel is of a tunnel-less structure even when provided with the rib.

In the present embodiment, since each powertrain PT includes the traveling motor M, no internal combustion engine needs to be mounted in the front-side space R2 and thus no exhaust pipe needs to be guided to the vehicle rear side. When a powertrain PT is mounted in the rear-side space R4, the rear wheels RT can be driven by the powertrain PT and a propeller shaft can be omitted. Accordingly, the occupant-space-side floor panel 41 can have a tunnel-less structure.

Figure 3:
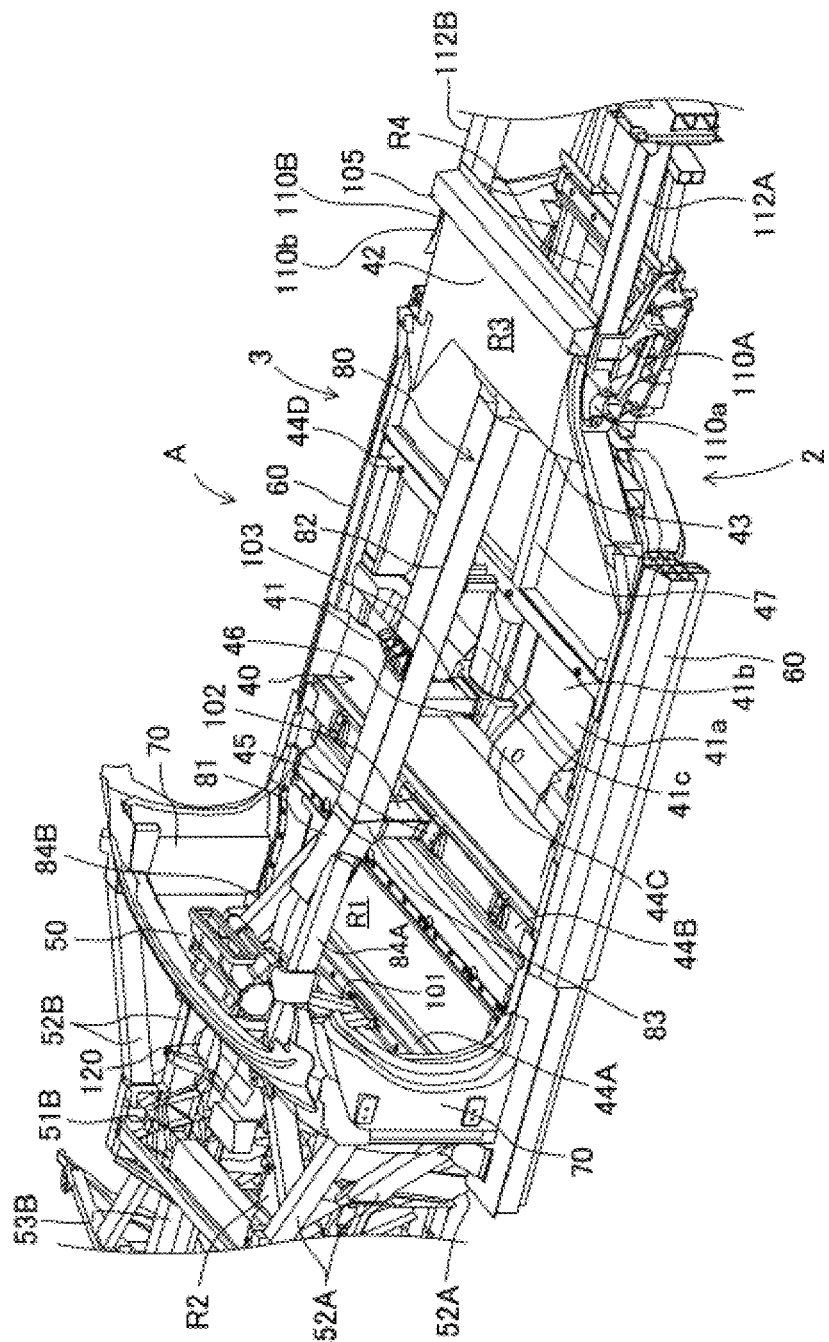
FIG. 3 is a perspective view in which part of the vehicle-body structure is viewed from an upper side.

As illustrated in FIG. 3 as well, a recessed portion 41a formed bulging downward is formed at a front-rear direction intermediate portion of the occupant-space-side floor panel 41. The recessed portion 41a has a bottom surface 41b on which the feet of a rear-seat passenger sitting on a rear seat RS can be placed. The bottom surface 41b is substantially horizontally formed. A front-side part of the recessed portion 41a is formed to be gradually deeper toward the rear side. The recessed portion 41a may be continuously formed from a left side portion of the occupant-space-side floor panel 41 to a right side portion thereof.

The bottom surface 41b of the recessed portion 41a has a height substantially same as that of a lower portion of the corresponding side sill 60 to be described later, and accordingly, the height of the bottom surface 41b is sufficiently low. The positional relation between the recessed portion 41a and a seat cushion of each rear seat RS in the front-rear direction is set such that the feet of a rear-seat passenger sitting on the rear seat RS are naturally placed on the bottom surface 41b when the feet are held directly downward. The position of a front portion of the recessed portion 41a is set such that the feet of a rear-seat passenger sitting on the rear seat RS are placed on the bottom surface 41b even when the feet are moved obliquely forward. In other words, the position of the recessed portion 41*a* and the dimension thereof in the front-rear direction are set such that the feet of a rear-seat passenger can be placed on the bottom surface 41*b* when the feet are moved somehow in the front-rear direction. Accordingly, a foot space for a rear-seat passenger can be expanded, which improves comfortability. The depth of the recessed portion 41*a* may be, for example, 5 cm or larger, or 10 cm or larger.

A floor frame 41*c* extending in the front-rear direction is provided at a right-left direction central portion of the recessed portion 41*a*. A lower portion of the floor frame 41*c* is fixed to the bottom surface 41*b* of the recessed portion 41*a*. A part at which the recessed portion 41*a* is formed at the occupant-space-side floor panel 41 can be reinforced since the floor frame 41*c* is provided.

A rear reinforcement member 47 extending in the front-rear direction is provided on the rear side of the recessed portion 41*a* of the occupant-space-side floor panel 41. The rear reinforcement member 47 is joined to the upper surface of the occupant-space-side floor panel 41. The rear reinforcement member 47 may be provided as necessary and may be omitted.

The trunk-space-side floor panel 42 is positioned higher than the occupant-space-side floor panel 41. The rear-side space R4 is positioned lower than the trunk-space-side floor panel 42. In other words, the trunk-space-side floor panel 42 is arranged to separate the trunk space R3 from the rear-side space R4. The dimension of the trunk-space-side floor panel 42 in the front-rear direction is set to be shorter than the dimension of the occupant-space-side floor panel 41 in the front-rear direction.

Since the trunk-space-side floor panel 42 is arranged at a higher position than the occupant-space-side floor panel 41, the connection panel 43 extends in the up-down direction. The connection panel 43 may be vertical or may be tilted such that the connection panel 43 is positioned farther on the rear side at a position farther on the upper side.

Figure 7:
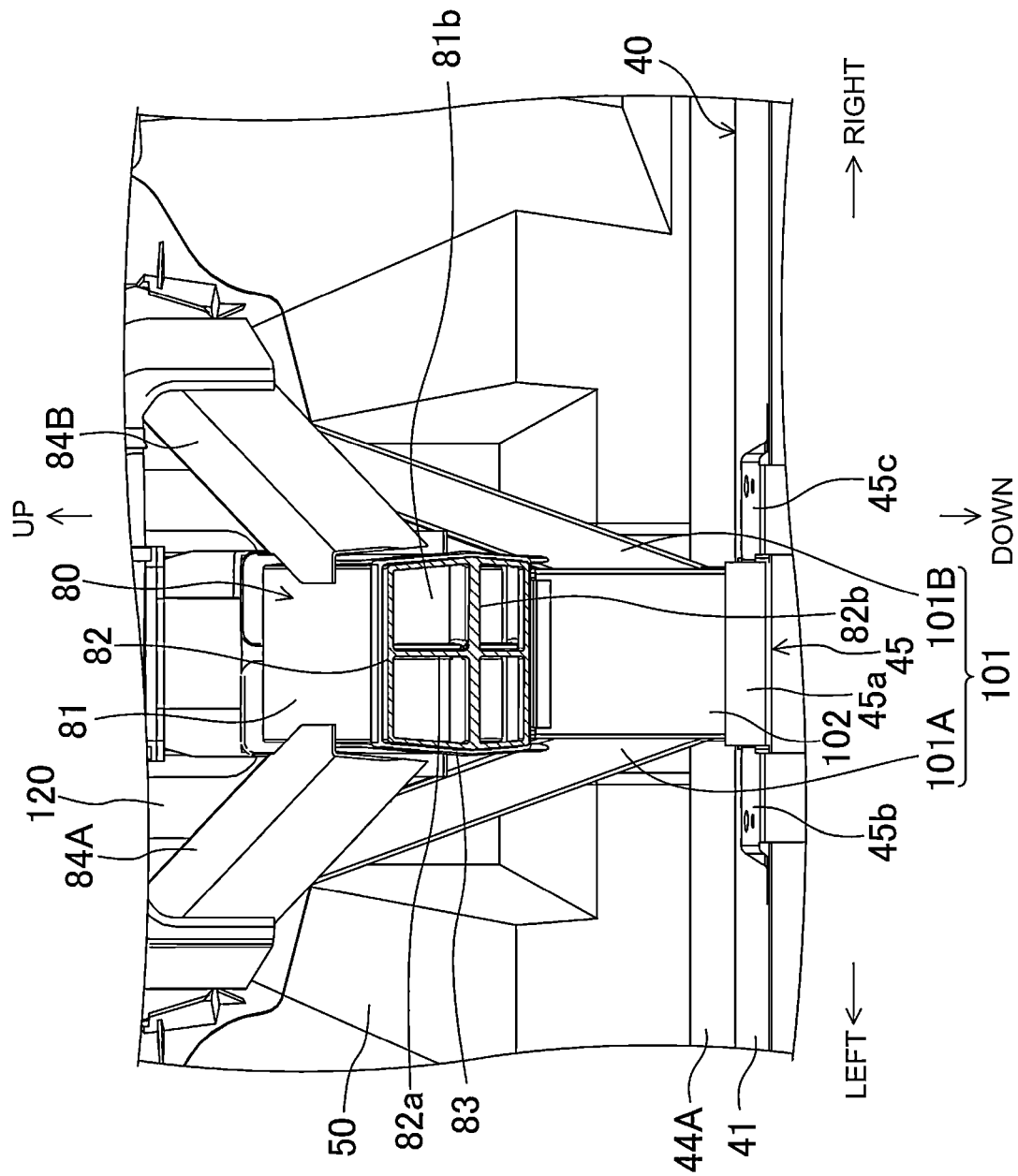
FIG. 7 is a cross-sectional diagram along line VII-VII in FIG. 4.

As illustrated in FIG. 7 as well, the dash panel 50 is a member as a partition wall between the front-side space R2 and the occupant space R1 and extends upward from a front portion of the occupant-space-side floor panel 41 and in the right-left direction as well, thereby partitioning the front portion of the occupant space R1.

As illustrated in FIG. 4, the right and left side sills 60 are disposed extending in the front-rear direction at right and left end portions, respectively, of the occupant-space-side floor panel 41. The left end portion of the occupant-space-side floor panel 41 is connected to an up-down direction intermediate portion of the left side sill 60, an upper part of the side sill 60 protrudes upward from a connection site of the occupant-space-side floor panel 41, and a lower part of the side sill 60 protrudes downward from the connection site of the occupant-space-side floor panel 41. Since the battery unit Y including the batteries FB and RB is disposed at a lower position than the occupant-space-side floor panel 41, such arrangement is made that the lower part of the side sill 60 overlaps with the batteries FB and RB in a vehicle side view. Similarly, the right side sill 60 is connected to the right end portion of the occupant-space-side floor panel 41.

As illustrated in FIG. 3, the upper-portion structural body 3 includes a pair of right and left hinge pillars 70. The right hinge pillar 70 extends upward from a front end portion of the right side sill 60. The left hinge pillar 70 extends upward from a front end portion of the left side sill 60. The right and left front doors FD (illustrated in FIG. 1) are rotatably attached to the right and left hinge pillars 70, respectively. A left edge portion of the dash panel 50 is connected to a right-side surface of the left hinge pillar 70. A right edge portion of the dash panel 50 is connected to a left-side surface of the right hinge pillar 70. Note that the upper-portion structural body 3 is also provided with a center pillar, a rear pillar, and the like.

A left-side front-wheel suspension support member 51A that supports the suspension device (front suspension device) SP1 (illustrated with virtual lines in FIG. 4) for the left front wheel FT is provided on the left side on the front side of the dash panel 50 in the upper-portion structural body 3. A right-side front-wheel suspension support member 51B that supports the suspension device (front suspension device) SP2 (illustrated with virtual lines in FIG. 4) for the right front wheel FT is provided on the right side on the front side of the dash panel 50 in the upper-portion structural body 3. The suspension devices SP1 and SP2 are not limited to a particular format but include suspension arms that freely swingably support the front wheels FT in the up-down direction, shock absorbers, springs, or the like. End portions of the suspension arms on the vehicle body side, upper end portions of the shock absorbers, or the like are attached to the front-wheel suspension support members 51A and 51B. The front-wheel suspension support members 51A and 51B can be made of, for example, aluminum die cast, but are not limited thereto and may be made of a combination of steel plates or the like.

Figure 6:
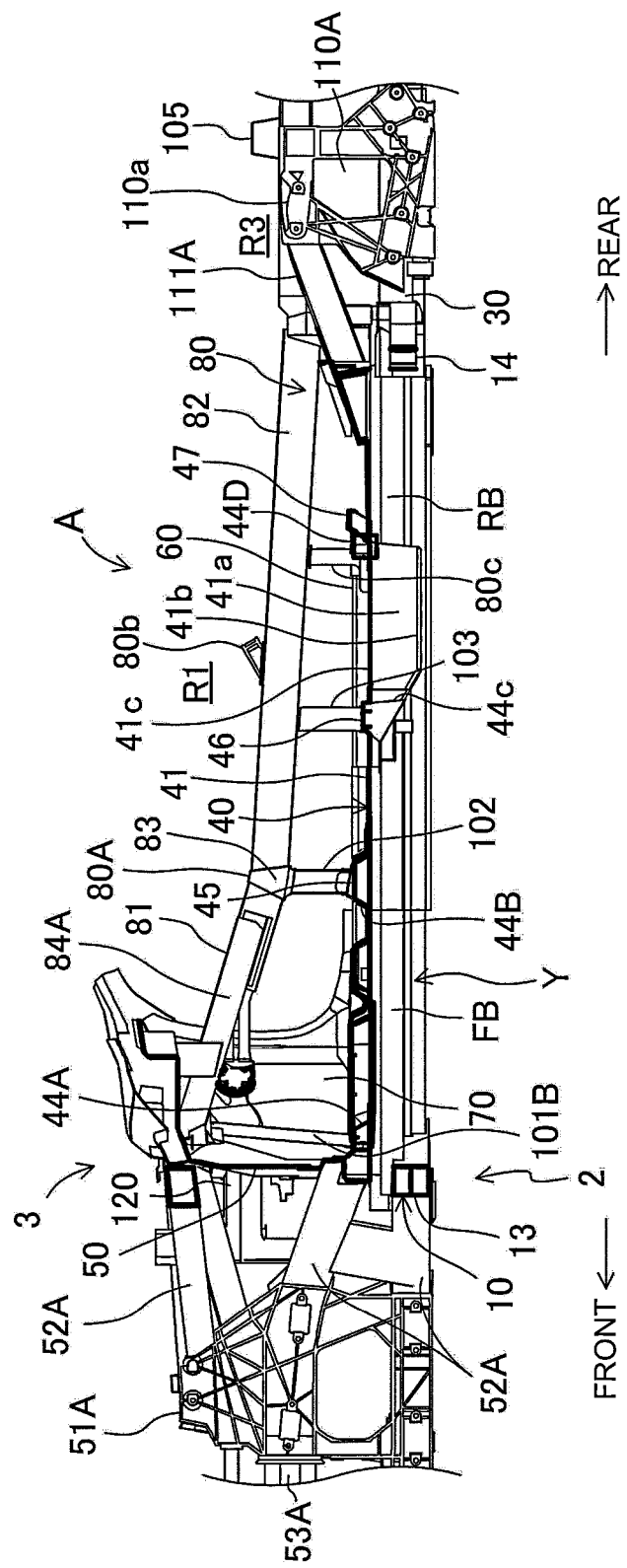
FIG. 6 is a cross-sectional diagram along line VI-VI in FIG. 4.

As illustrated in, for example, FIG. 6, three left-side fixation frames 52A for fixing the left-side front-wheel suspension support member 51A are provided on the left side on the front side of the dash panel 50. The three left-side fixation frames 52A are arranged at an interval from each other in the up-down direction, and front portions of the three left-side fixation frames 52A are fixed to the front-wheel suspension support member 51A. Rear portions of the left-side fixation frames 52A arranged uppermost and at an up-down direction intermediate position are fixed to the left-side hinge pillar 70 and the left side of the dash panel 50. A rear portion of the left-side fixation frame 52A arranged lowermost is fixed to the left side sill 60.

As partially illustrated in FIG. 3, three right-side fixation frames 52B for fixing the right-side front-wheel suspension support member 51B are provided on the right side on the front side of the dash panel 50. The three right-side fixation frames 52B are arranged at an interval from each other in the up-down direction, and front portions of the three right-side fixation frames 52B are fixed to the front-wheel suspension support member 51B. Rear portions of the right-side fixation frames 52B arranged uppermost and at an up-down direction intermediate position are fixed to the right-side hinge pillar 70 and the right side of the dash panel 50. A rear portion of the right-side fixation frame 52B arranged lowermost is fixed to the right side sill 60.

As illustrated in FIG. 2, a left-side crush can 53A extending toward the front side is fixed to a front portion of the left-side front-wheel suspension support member 51A. A right-side crush can 53B extending toward the front side is fixed to a front portion of the right-side front-wheel suspension support member 51B. A bumper reinforcement 140 extending in the right-left direction is attached to a front portion of the left-side crush can 53A and a front portion of the right-side crush can 53B.

As illustrated in FIG. 4, the upper-portion structural body 3 includes a left-side front frame 54A and a right-side front frame 54B. Specifically, the left-side front frame 54A connecting a front portion of a center frame 80 to be described later and the left-side front-wheel suspension support member 51A, and the right-side front frame 54B connecting the front portion of the center frame 80 and the right-side front-wheel suspension support member 51B are provided on the front side of the dash panel 50. The left-side front frame 54A is tilted such that the left-side front frame 54A is positioned farther on the left side at a position farther on the front side. The right-side front frame 54B is tilted such that the right-side front frame 54B is positioned farther on the right side at a position farther on the front side. Since the right and left front-wheel suspension support members 51A and 51B are each connected to the front portion of the center frame 80, the stiffness of the front-wheel suspension support members 51A and 51B is increased, which improves maneuvering stability of the vehicle. In addition, the stiffness of the vehicle front side including the vicinity of the dash panel 50 is increased as well.

The upper-portion structural body 3 includes a left-side rear-side frame 112A extending in the front-rear direction on the left side on the rear side of the rear portion of the occupant-space-side floor panel 41, and a right-side rear-side frame 112B extending in the front-rear direction on the right side on the rear side of the rear portion of the occupant-space-side floor panel 41. A front portion of the left-side rear-side frame 112A is connected to a rear portion of the left-side side sill 60. A front portion of the right-side rear-side frame 112B is connected to a rear portion of the right-side side sill 60. A front-rear direction intermediate portion of the left-side rear-side frame 112A and a front-rear direction intermediate portion of the right-side rear-side frame 112B are connected to each other through a trunk-side cross member (connecting member) 105 extending in the right-left direction.

A left-side rear-wheel suspension support member 110A that supports the suspension device (rear suspension device) SP3 (illustrated with virtual lines in FIG. 4) for the left rear wheel RT is provided on the left side on the rear side of the connection panel 43 in the upper-portion structural body 3. The rear-wheel suspension support member 110A is fixed to the left-side rear-side frame 112A. A right-side rear-wheel suspension support member 110B that supports the suspension device (rear suspension device) SP4 (illustrated with virtual lines in FIG. 4) for the right rear wheel RT is provided on the right side on the rear side of the connection panel 43 in the upper-portion structural body 3. The rear-wheel suspension support member 110B is fixed to the right-side rear-side frame 112B. The suspension devices SP3 and SP4 are not limited to a particular format but include suspension arms that freely swingably support the rear wheels RT in the up-down direction, shock absorbers, springs, or the like.

An upper portion of the spring or shock absorber included in the left-side suspension device SP3 is connected to an upper portion of the rear-wheel suspension support member 110A. As illustrated in FIG. 3, the upper portion of the rear-wheel suspension support member 110A is a left-side load input portion 110a to which loads from the springs or the shock absorbers are input. An upper portion of the spring or shock absorber included in the right-side suspension device SP4 is connected to an upper portion of the rear-wheel suspension support member 110B. The upper portion of the rear-wheel suspension support member 110B is a right-side load input portion 110b to which a load from the spring or the shock absorber is input. The left-side load input portion 110a and the right-side load input portion 110b are also fixed to the right and left sides of the trunk-space-side floor panel 42. In addition, the left-side load input portion 110a and the right-side load input portion 110b are connected to each other through the trunk-side cross member 105. The trunk-side cross member 105 is joined to an upper surface of the trunk-space-side floor panel 42, and a closed cross-section structure extending in the vehicle width direction is constituted by the trunk-space-side floor panel 42 and the trunk-side cross member 105.

As illustrated in FIG. 2, a rear-portion cross member 44E is provided at a position lower than the left-side load input portion 110a and the right-side load input portion 110b. The rear-portion cross member 44E is joined to the rear portion of the occupant-space-side floor panel 41.

The upper-portion structural body 3 can be partitioned into, for example, a front-portion vehicle-body structure and a rear-portion vehicle-body structure. As illustrated in FIG. 4, the rear-portion vehicle-body structure may be the rear side of the occupant-space-side floor panel 41 in the upper-portion structural body 3. A left-side rear frame 111A connecting a rear portion of the center frame 80 and the left-side rear-wheel suspension support member 110A, and a right-side rear frame 111B connecting the rear portion of the center frame 80 and the right-side rear-wheel suspension support member 110B are provided on the rear side of the connection panel 43 of the upper-portion structural body 3. Since the right and left rear-wheel suspension support members 110A and 110B are each connected to the rear portion of the center frame 80, the stiffness of the rear-wheel suspension support members 110A and 110B is increased, which improves maneuvering stability of the vehicle. In addition, the stiffness of the vehicle rear side including the vicinity of the connection panel 43 is increased as well.

The left-side rear frame 111A and the right-side rear frame 111B are arranged at a lower position than the trunk-space-side floor panel 42. As illustrated in FIG. 6, a rear portion of the left-side rear frame 111A is fixed to the upper portion of the rear-wheel suspension support member 110A, in other words, the left-side load input portion 110a. The left-side rear frame 111A is tilted in a side view such that the left-side rear frame 111A is positioned farther on the lower side at a position farther on the front side from the upper portion of the rear-wheel suspension support member 110A toward the front side, and is also tilted in a plan view such that the left-side rear frame 111A is positioned closer to a vehicle width direction central portion at a position farther on the front side as illustrated in FIG. 4. A rear portion of the right-side rear frame 111B is fixed to the upper portion of the rear-wheel suspension support member 110B, in other words, the right-side load input portion 110b. The right-side rear frame 111B is tilted in a side view such that the right-side rear frame 111B is positioned farther on the lower side at a position farther on the front side from the upper portion of the rear-wheel suspension support member 110B toward the front side, and is also tilted in a plan view such that the right-side rear frame 111B is positioned closer to the vehicle width direction central portion at a position farther on the front side as illustrated in FIG. 4. Accordingly, the left-side rear frame 111A and the right-side rear frame 111B are each arranged such that the rear frame is positioned on a vehicle-width-direction outer side at a position farther on the rear side, and the interval between the left-side rear frame 111A and the right-side rear frame 111B is smaller at a position farther on the front side.

The rear portion of the left-side rear frame 111A is also connected to the front-rear direction intermediate portion of the left-side rear-side frame 112A. Accordingly, the left-side rear frame 111A serves as a left-side connection frame extending from the rear portion of the center frame 80 to the left-side rear-side frame 112A and connecting the rear portion of the center frame 80 and the left-side rear-side frame 112A. The left-side rear frame 111A also serves as a left-side rear connection frame connecting the left-side load input portion 110a and the rear-portion cross member 44E. Specifically, a front portion of the left-side rear frame 111A is fixed to the left-side load input portion 110a, and the rear portion of the left-side rear frame 111A is also fixed to the rear-portion cross member 44E.

The rear portion of the right-side rear frame 111B is also connected to the front-rear direction intermediate portion of the right-side rear-side frame 112B. Accordingly, the right-side rear frame 111B serves as a right-side connection frame extending from the rear portion of the center frame 80 to the right-side rear-side frame 112B and connecting the rear portion of the center frame 80 and the right-side rear-side frame 112B.

The right-side rear frame 111B also serves as a right-side rear connection frame connecting the right-side load input portion 110b and the rear-portion cross member 44E. Specifically, a front portion of the right-side rear frame 111B is fixed to the right-side load input portion 110b, and the rear portion of the right-side rear frame 111B is also fixed to the rear-portion cross member 44E.

The left-side rear frame 111A is arranged at an upward tilt toward the left-side load input portion 110a. Accordingly, an upward load from the rear suspension device SP3 is input to the left-side rear frame 111A in a pulling direction, and thus deflection deformation of the left-side rear frame 111A is unlikely to occur as compared to a case in which a load in a compression direction is input, which leads to suppression of vibration and noise due to load input from the rear suspension device SP3. This is same for the right-side rear frame 111B.

Figure 18:
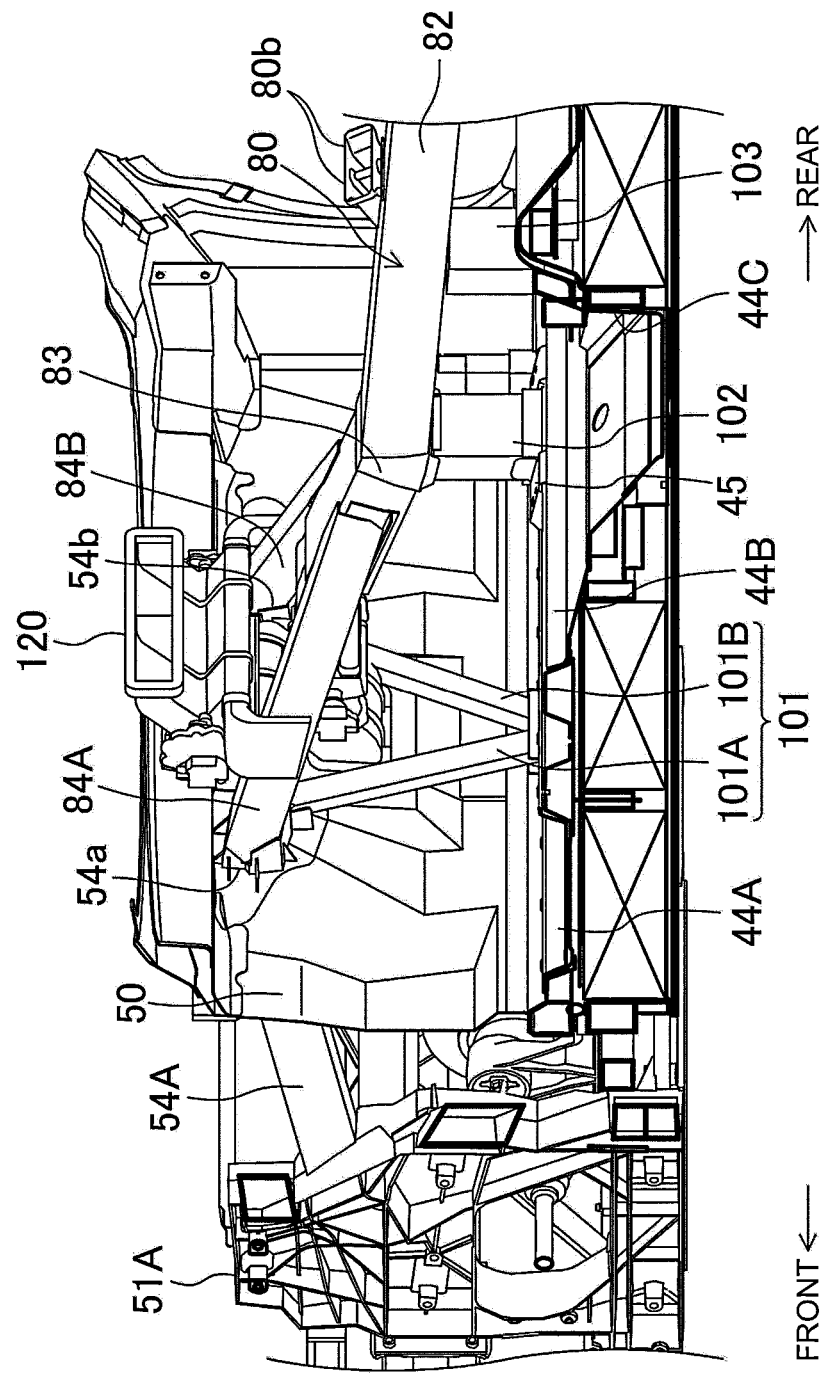
FIG. 18 is a perspective view of a dash panel and the vicinity thereof when viewed from a vehicle rear side.

As illustrated in FIG. 18, the left-side rear frame 111A is arranged on the front side of the left rear drive shaft S2. The left rear drive shaft S2 is arranged such that the left rear drive shaft S2 overlaps with part of the left-side rear frame 111A when viewed in the front-rear direction. Specifically, the height of a right-left direction intermediate portion of the left rear drive shaft S2 is substantially equal to the height of a part between the front and rear portions of the left-side rear frame 111A.

The right-side rear frame 111B is arranged on the front side of the right rear drive shaft S2. The right rear drive shaft S2 is arranged such that the right rear drive shaft S2 overlaps with part of the right-side rear frame 111B when viewed in the front-rear direction. Specifically, the height of a right-left direction intermediate portion of the right rear drive shaft S2 is substantially equal to the height of a part between the front and rear portions of the right-side rear frame 111B.

As illustrated in FIGS. 3 and 6, the occupant-space-side floor panel 41 includes a front-portion cross member 44A, an intermediate cross member 44B, a recessed-portion front-side cross member 44C, a recessed-portion rear-side cross member 44D, and the rear-portion cross member 44E. The front-portion cross member 44A, the intermediate cross member 44B, the recessed-portion front-side cross member 44C, the recessed-portion rear-side cross member 44D, and the rear-portion cross member 44E extend in the right-left direction and are fixed to the upper surface of the occupant-space-side floor panel 41. Thus, the front-portion cross member 44A, the intermediate cross member 44B, the recessed-portion front-side cross member 44C, the recessed-portion rear-side cross member 44D, and the rear-portion cross member 44E are disposed such that the members intersect with the center frame 80, which will be described later, in a plan view in the occupant space R1.

The front-portion cross member 44A is disposed at the front portion of the occupant-space-side floor panel 41. A front portion of the front-portion cross member 44A is also joined to the lower portion of the dash panel 50. The intermediate cross member 44B is disposed on the rear side of the front-portion cross member 44A and on the front side of the recessed portion 41a, and a closed cross-section is constituted by the intermediate cross member 44B and the occupant-space-side floor panel 41. The rear-portion cross member 44E is disposed at the rear portion of the occupant-space-side floor panel 41. The rear-portion cross member 44E is also fixed to the connection panel 43.

The recessed-portion front-side cross member 44C is disposed extending in the right-left direction along the front portion of the recessed portion 41a on the rear side of the intermediate cross member 44B. The recessed-portion rear-side cross member 44D is disposed extending in the right-left direction along a rear portion of the recessed portion 41a on the rear side of the recessed-portion front-side cross member 44C. A closed cross-section is constituted by the recessed-portion front-side cross member 44C and the occupant-space-side floor panel 41, and a closed cross-section is constituted by the recessed-portion rear-side cross member 44D and the occupant-space-side floor panel 41. Since the recessed-portion front-side cross member 44C and the recessed-portion rear-side cross member 44D are provided, the part at which the recessed portion 41a is formed can be reinforced. A front portion of the floor frame 41c provided inside the recessed portion 41a is connected to a right-left direction central portion of the recessed-portion front-side cross member 44C, and a rear portion of the floor frame 41c is connected to a right-left direction central portion of the recessed-portion rear-side cross member 44D.

Figure 8:
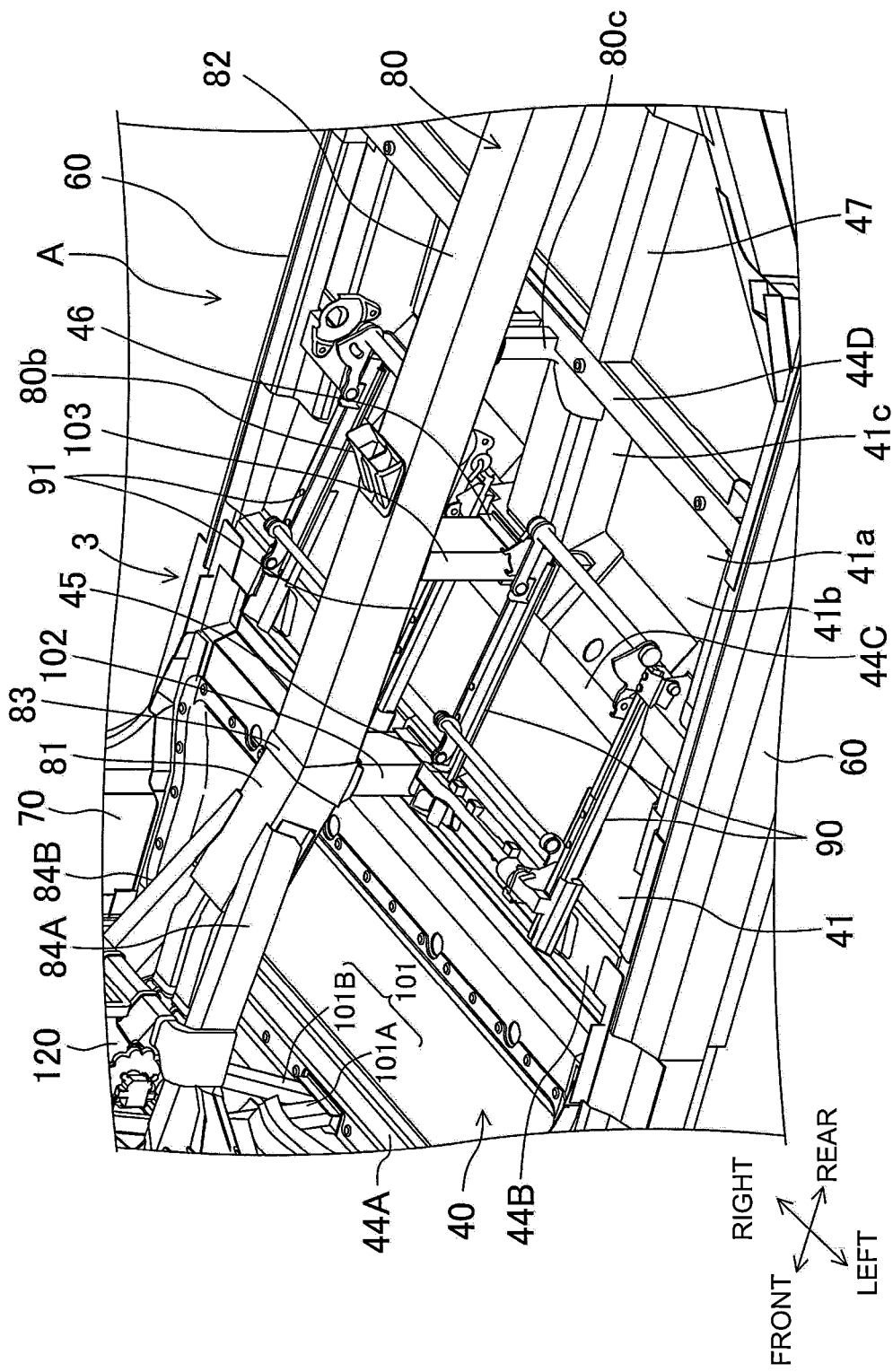
FIG. 8 is a perspective view illustrating an occupant-space-side floor panel and the vicinity thereof in an enlarged manner.

As illustrated in FIG. 8, the upper-portion structural body 3 includes a pair of right and left left-side seat rails 90 supporting the left-side front seat FS, and a pair of right and left right-side seat rails 91 supporting the right-side front seat FS. The left-side seat rails 90 are used to adjust the position of the left-side front seat FS in the front-rear direction, are disposed on the left side on the occupant-space-side floor panel 41, and extend in the front-rear direction. The right-side seat rails 91 are used to adjust the position of the right-side front seat FS in the front-rear direction, are disposed on the right side of the occupant-space-side floor panel 41, and extend in the front-rear direction.

Figure 9:
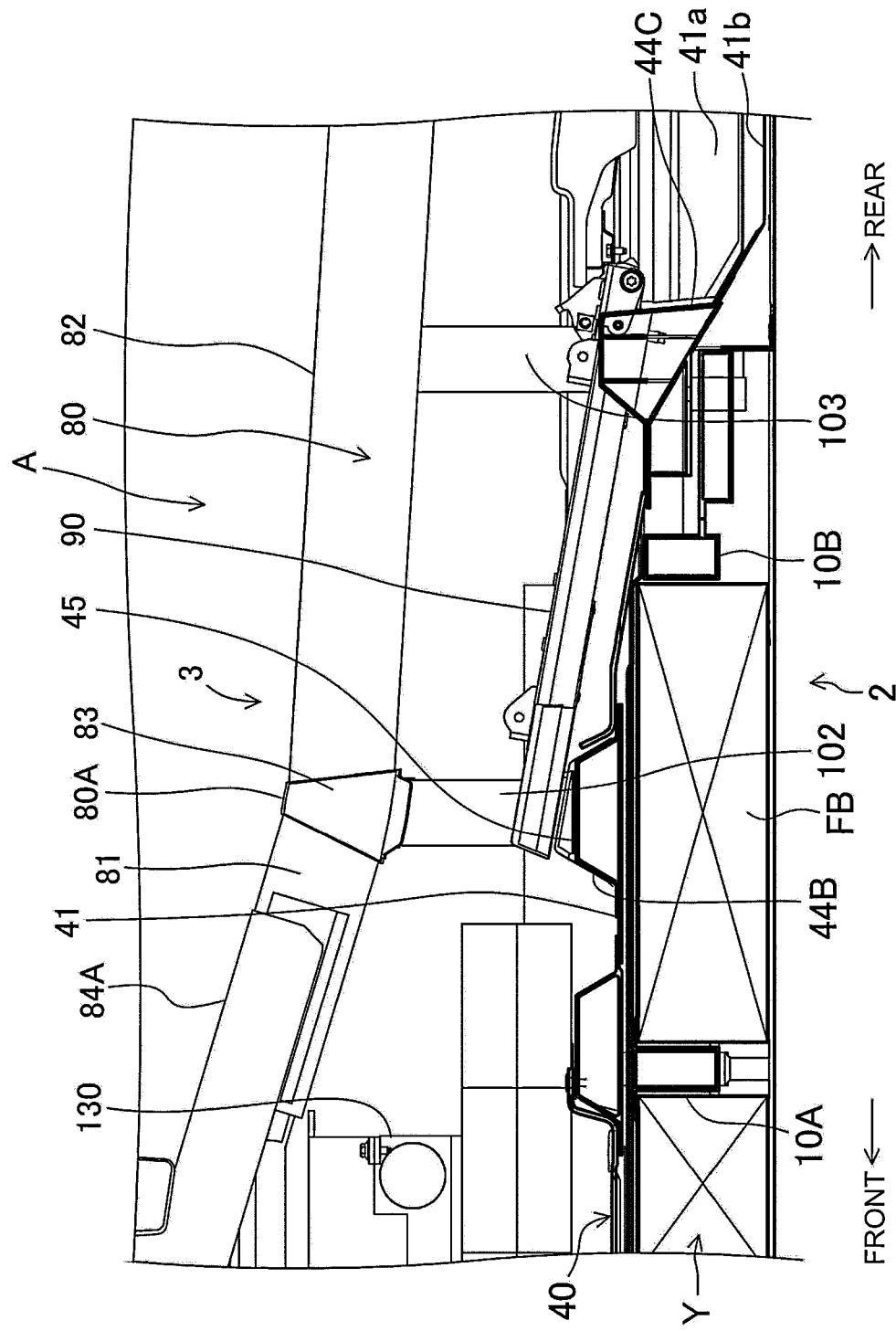
FIG. 9 is a cross-sectional diagram illustrating a seat rail and the vicinity thereof in an enlarged manner.

The left-side seat rails 90 are positioned higher than the intermediate cross member 44B and the recessed-portion front-side cross member 44C and attached to the intermediate cross member 44B and the recessed-portion front-side cross member 44C. Specifically, as illustrated in FIG. 9 as well, the left-side seat rails 90 extend from the intermediate cross member 44B to the recessed-portion front-side cross member 44C, front portions of the left-side seat rails 90 are attached to the intermediate cross member 44B, and rear portions of the left-side seat rails 90 are attached to the recessed-portion front-side cross member 44C.

Similarly, the right-side seat rails 91 extend from the intermediate cross member 44B to the recessed-portion front-side cross member 44C, front portions of the right-side seat rails 91 are attached to the intermediate cross member 44B, and rear portions of the right-side seat rails 91 are attached to the recessed-portion front-side cross member 44C.

Figure 10:
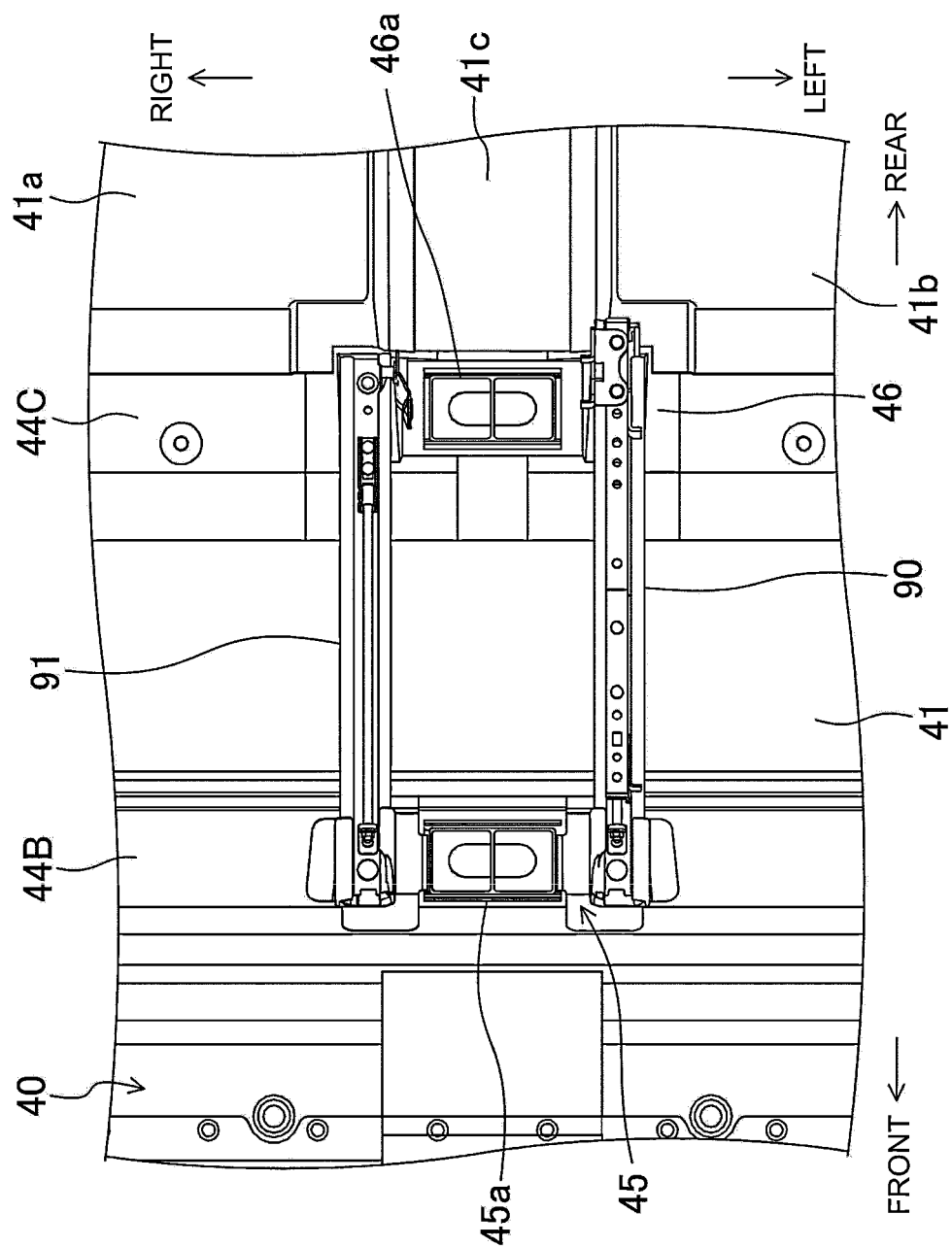
FIG. 10 is a plan view illustrating part of the seat rail and the vicinity thereof in an enlarged manner.
Figure 11:
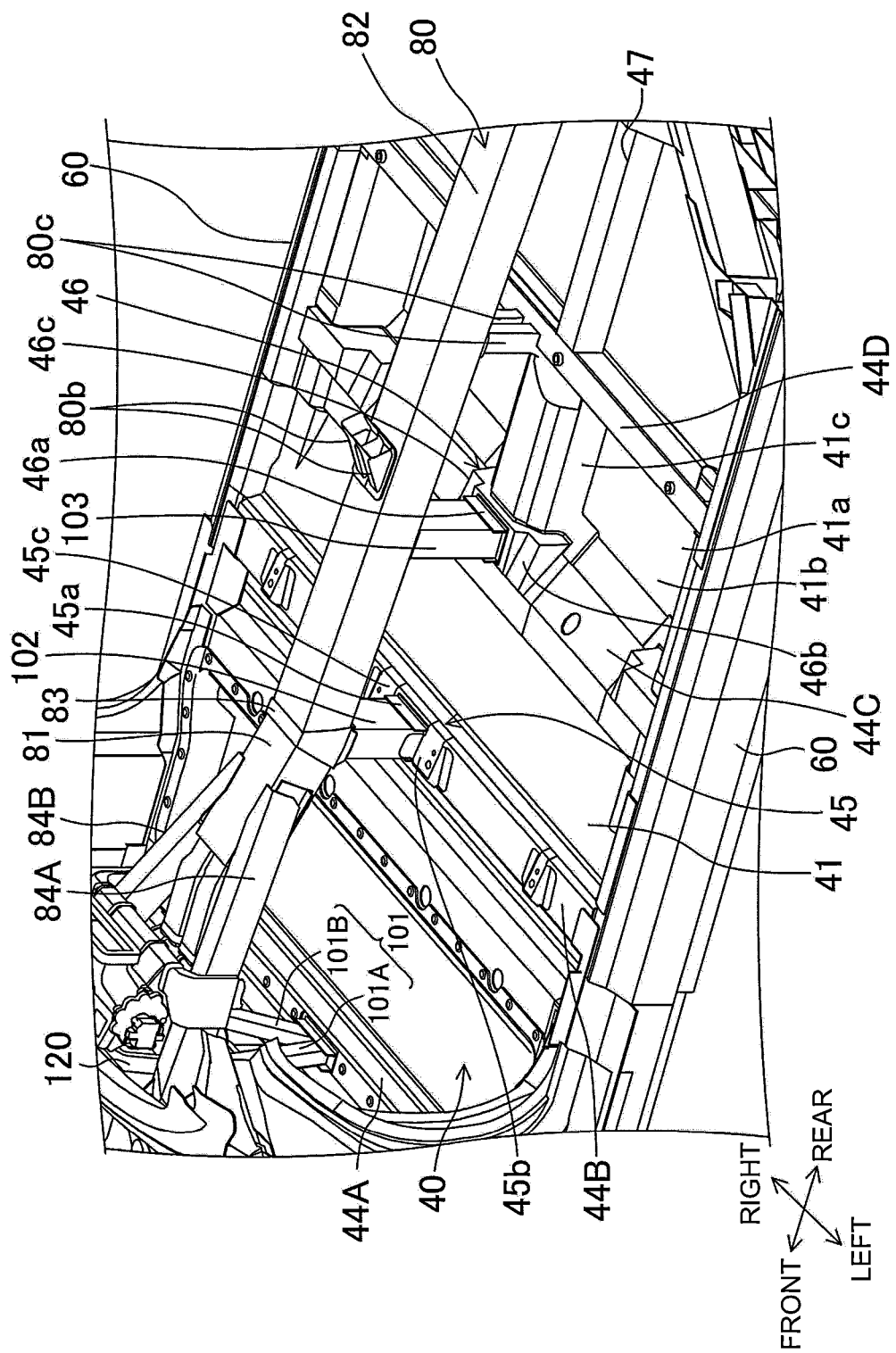
FIG. 11 is a perspective view illustrating a mounting part of the seat rail and the vicinity thereof in an enlarged manner.

As illustrated in FIG. 10, the intermediate cross member 44B includes a front-portion common bracket 45 to which the front portions of the left-side seat rails 90 and the front portions of the right-side seat rails 91 are attached in a state in which the seat rails are separated from each other in the right-left direction. Note that the center frame 80 is omitted in FIG. 10. As illustrated in FIG. 11, the front-portion common bracket 45 has a shape that is long in the right-left direction and is fixed to an upper surface of the intermediate cross member 44B. A right-left direction central portion of the front-portion common bracket 45 is positioned at a right-left direction central portion of the intermediate cross member 44B. A central fixation portion 45*a* (illustrated only in FIGS. 10 and 11) into which a lower portion of a second connecting member 102 to be described later is inserted is provided at the right-left direction central portion of the front-portion common bracket 45. A left-side fixation portion 45*b* (illustrated only in FIGS. 4 and 11) to which the front portions of the left-side seat rails 90 are fixed by fastening members such as bolts or screws is provided on the left side of the central fixation portion 45*a* of the front-portion common bracket 45. A right-side fixation portion 45*c* (illustrated only in FIGS. 4 and 11) to which the front portions of the right-side seat rails 91 are fixed by fastening members is provided on the right side of the central fixation portion 45*a* of the front-portion common bracket 45. Note that the seat rails are omitted in FIGS. 3 to 5 and 11.

The recessed-portion front-side cross member 44C includes a rear-portion common bracket 46 to which the rear portions of the left-side seat rails 90 and the rear portions of the right-side seat rails 91 are attached in a state in which the seat rails are separated from each other in the right-left direction. As illustrated in FIG. 11, the rear-portion common bracket 46 has a shape that is long in the right-left direction and is fixed to an upper surface of the recessed-portion front-side cross member 44C. A right-left direction central portion of the rear-portion common bracket 46 is positioned at the right-left direction central portion of the recessed-portion front-side cross member 44C. A central fixation portion 46*a* (illustrated only in FIGS. 10 and 11) in which a lower portion of a connecting member to be described later is inserted and fixed is provided at the right-left direction central portion of the rear-portion common bracket 46. A left-side fixation portion 46*b* (illustrated only in FIGS. 4 and 11) to which the rear portions of the left-side seat rails 90 are fixed by fastening members is provided on the left side of the central fixation portion 46*a* of the rear-portion common bracket 46. A right-side fixation portion 46*c* (illustrated only in FIGS. 4 and 11) to which the rear portions of the right-side seat rails 91 are fixed by fastening members is provided on the right side of the central fixation portion 46*a* of the rear-portion common bracket 46.

As illustrated in, for example, FIG. 8, the upper-portion structural body 3 includes the center frame 80 that is continuous from the dash panel 50 to the connection panel 43. The center frame 80 is positioned at a right-left direction central portion, and also the front-portion central member 16 and the first to third rear-portion central members 17 to 19 of the battery unit Y are positioned at the right-left direction central portion. Specifically, the disposition positions of the front-portion central member 16 and the first to third rear-portion central members 17 to 19 and the center frame 80 are set to have a positional relation in which the front-portion central member 16 and the first to third rear-portion central members 17 to 19 each overlaps with the center frame 80 in a plan view.

The center frame 80 is disposed to be higher than and away from the occupant-space-side floor panel 41 at a right-left direction central portion of the occupant space R1 and extends in the front-rear direction. The distance between a lower surface of the center frame 80 and the upper surface of the occupant-space-side floor panel 41 may be set to be, for example, equal to or larger than 10 cm or equal to or larger than 20 cm at a part separated most. The left-side front seat FS and a rear seat RS are disposed on the left side of the center frame 80, and the right-side front seat FS and a rear seat RS are disposed on the right side of the center frame 80.

Since the center frame 80 is arranged to be higher than and away from the occupant-space-side floor panel 41, components and the like can be disposed in a space between a lower surface of the center frame 80 and the upper surface of the occupant-space-side floor panel 41. Alternatively, the space between the lower surface of the center frame 80 and the upper surface of the occupant-space-side floor panel 41 can be used as an object housing unit. As illustrated in FIGS. 5 and 6, the center frame 80 according to the present embodiment includes a bend portion 80A that bends in the up-down direction at a front-rear direction intermediate portion. Since the bend portion 80A is provided in the center frame 80, for example, a rear-side part of the center frame 80 can be positioned lower than a front-side part of the center frame 80, and thus comfortability of rear-seat passengers can be improved. Since the front-side part of the center frame 80 can be positioned higher than the rear-side part of the center frame 80, a large-sized component or object, a plurality of components, or the like can be arranged at a lower position than the front-side part of the center frame 80. The bend portion 80A is formed at a site on the front side of a front-rear direction central portion of the center frame 80. The formation position of the bend portion 80A is not limited to the illustrated position but may be, for example, the front-rear direction central portion of the center frame 80 or a site on the rear side of the front-rear direction central portion of the center frame 80.

Specifically, the center frame 80 includes a front-side frame member 81 (front side frame structure) extending in the front-rear direction, a rear-side frame member 82 (rear side frame structure) disposed on the vehicle rear side of the front-side frame member 81 and extending toward the rear side, and a connection member (connection structure) 83 connecting a rear portion of the front-side frame member 81 and a front portion of the rear-side frame member 82. The front-side frame member 81 and the rear-side frame member 82 have hollow shapes, in other words, tubular shapes extending in the front-rear direction and may be formed of, for example, an extruded material. The front-side frame member 81 and the rear-side frame member 82 having hollow shapes are lightweight and high-stiffness members. When the center frame 80 is used as an air sending means of air-conditioned air to be described later, a rear portion of the rear-side frame member 82 may be blocked to prevent leakage of air-conditioned air.

Vertical cross-sections of the front-side frame member 81 and the rear-side frame member 82 in the vehicle width direction have rectangular shapes, and thus the front-side frame member 81 and the rear-side frame member 82 each include an upper wall portion and a lower wall portion extending in the right-left direction and right and left sidewall portions extending in the up-down direction. Note that the cross-sectional shapes of the front-side frame member 81 and the rear-side frame member 82 are not limited to rectangular shapes but may be pentagonal shapes or higher polygonal shapes or may be circular shapes or elliptical shapes.

The dimension of the rear-side frame member 82 in the longitudinal direction is set to be longer than the dimension of the front-side frame member 81 in the longitudinal direction. Accordingly, a connection part between the front-side frame member 81 and the rear-side frame member 82 is positioned on the front side of a front-rear direction central portion of the occupant space R1. Note that the center frame 80 is not limited to the two-division structure of the front-side frame member 81 and the rear-side frame member 82 but may be formed as one member a front portion to a rear portion or may have a three-division structure.

The front-side frame member 81 is tilted at a first tilt angle relative to a horizontal plane and extends straight. The rear-side frame member 82 is tilted at a second tilt angle smaller than the first tilt angle relative to the horizontal plane and extends straight. Since the rear-side frame member 82 is tilted at a tilt angle different from that of the front-side frame member 81, the bend portion 80A that bends downward is formed at the connection part between the front-side frame member 81 and the rear-side frame member 82. In the present embodiment, the rear-side frame member 82 is arranged at a downward tilt toward the rear side.

Figure 12:
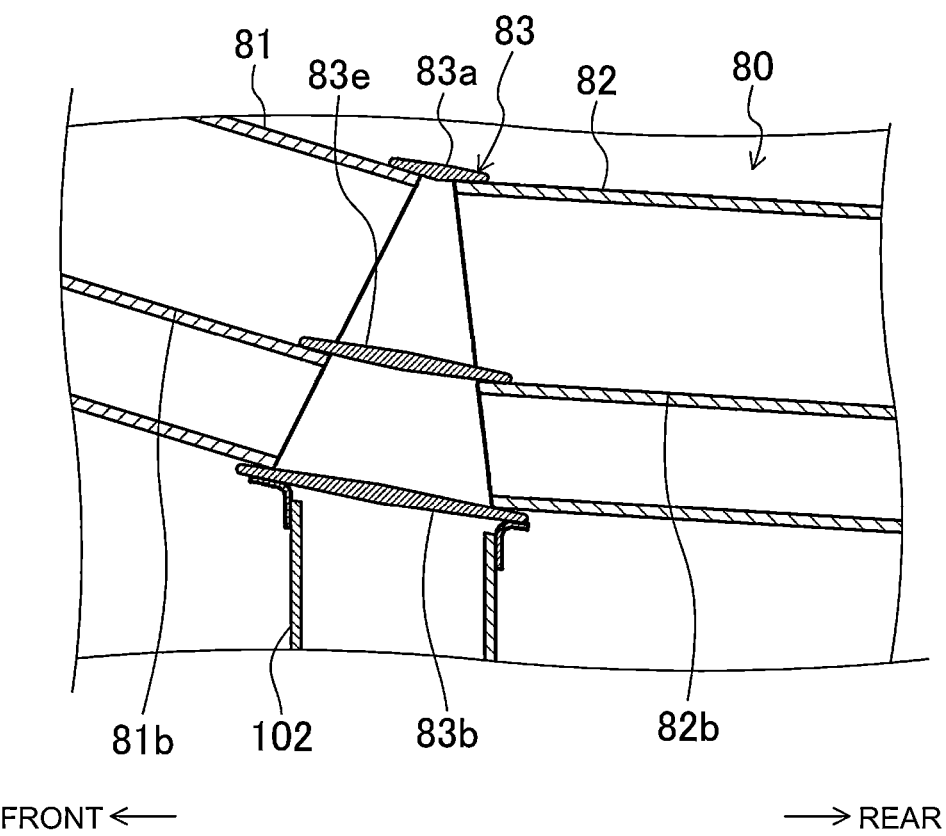
FIG. 12 is a cross-sectional diagram of a bend portion of a center frame and the vicinity thereof.
Figure 13:
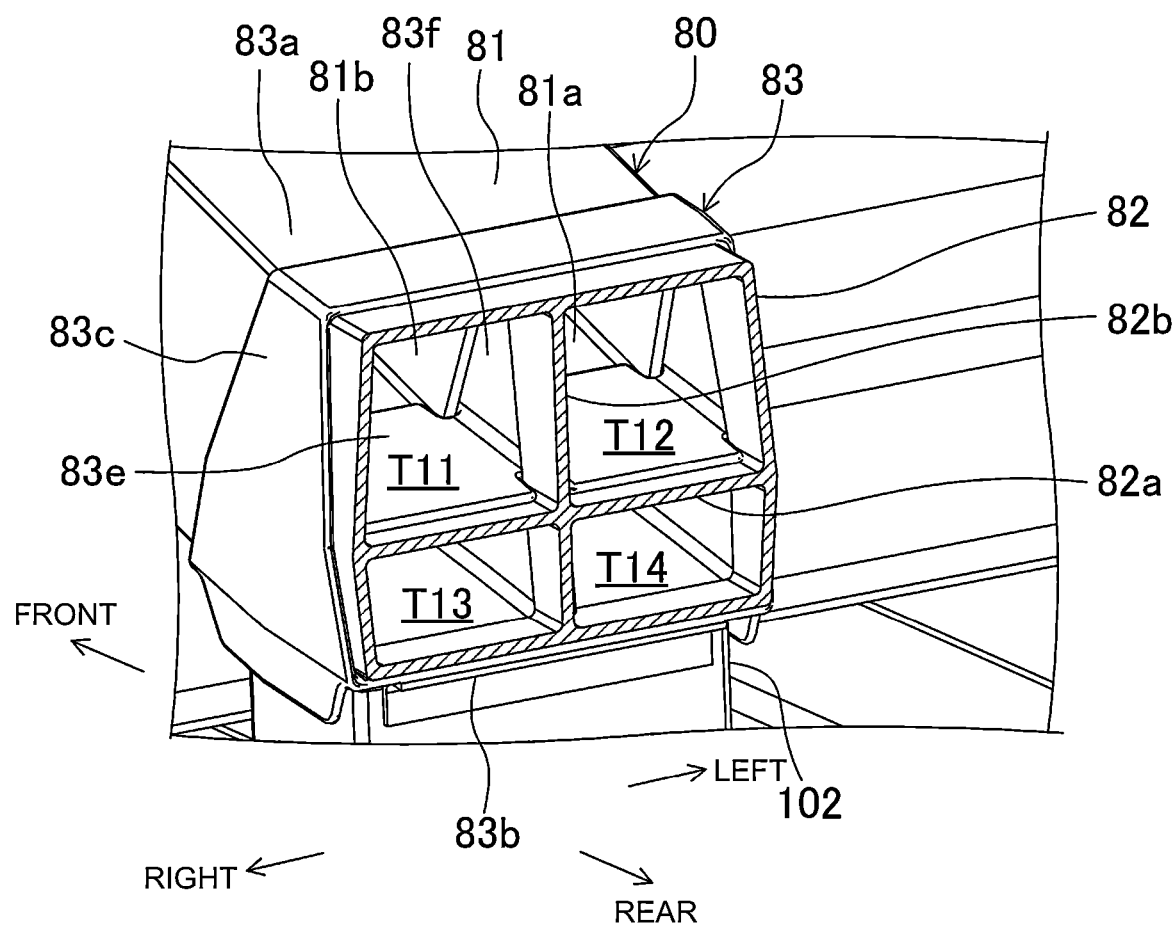
FIG. 13 is a cross-sectional diagram of the vicinity of a front portion of a rear-side frame member constituting the center frame.

As illustrated in FIGS. 12 and 13, inside the rear-side frame member 82, a first partition wall portion 82a for partitioning the inner space into an upper path and a lower path is provided extending in the vehicle width direction and the front-rear direction. In addition, inside the rear-side frame member 82, a second partition wall portion 82b for separating a left path on the vehicle-width-direction left side from a right path on the vehicle-width-direction right side is provided extending in the up-down direction and the front-rear direction. The first partition wall portion 82a and the second partition wall portion 82b are integrally formed. Four paths, namely, an upper-left path T11, an upper-right path T12, a lower-left path T13, and a lower-right path T14 are formed inside the rear-side frame member 82 by the first partition wall portion 82a and the second partition wall portion 82b. The first partition wall portion 82a and the second partition wall portion 82b function as ribs provided inside the center frame 80. Note that the first partition wall portion 82a and the second partition wall portion 82b may be provided as necessary, and one or both thereof may be omitted. Three partition wall portions or more may be provided.

Inside the front-side frame member 81, similarly to the inside of the rear-side frame member 82, a first partition wall portion 81a is provided extending in the vehicle width direction and the front-rear direction, and an inner space of the front-side frame member 81 is divided into an upper path and a lower path by the first partition wall portion 81a. In addition, a second partition wall portion 81b that separates a left path on the vehicle-width-direction left side from a right path on the vehicle-width-direction right side is provided inside the front-side frame member 81. Similarly to the rear-side frame member 82, an upper-left path T11, an upper-right path T12, a lower-left path T13, and a lower-right path T14 are formed inside the front-side frame member 81 by the first partition wall portion 81a and the second partition wall portion 81b.

Figure 14:
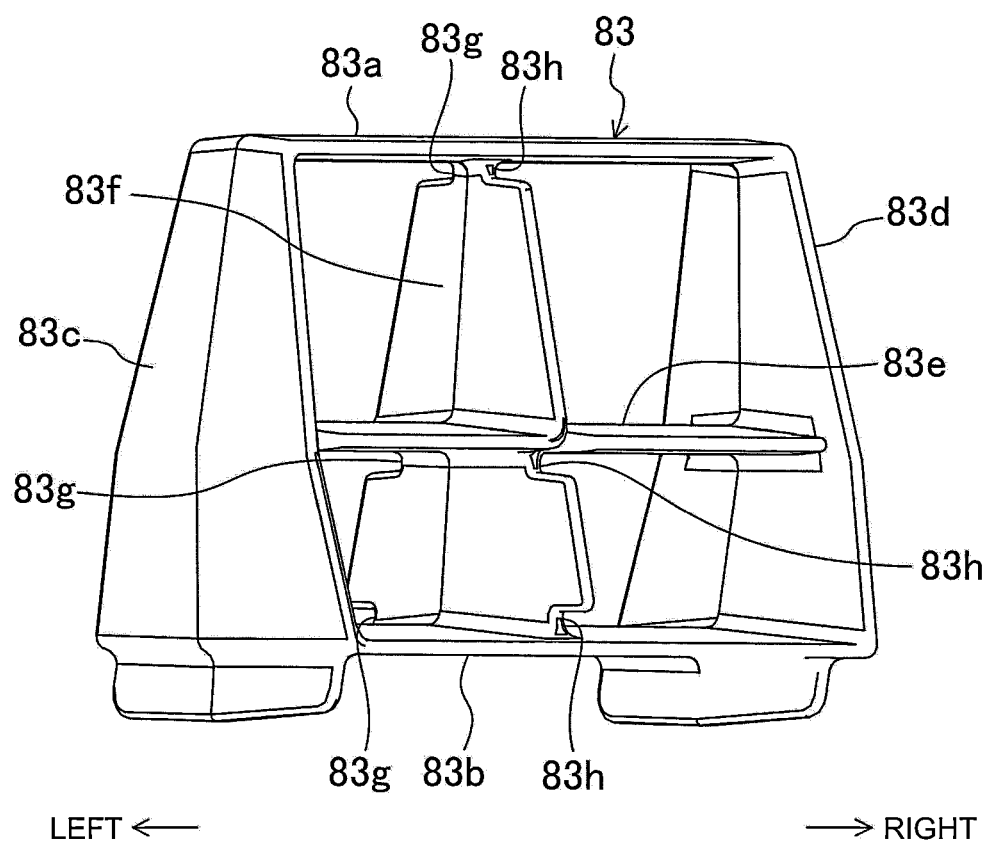
FIG. 14 is a perspective view of a connection member.
Figure 15:
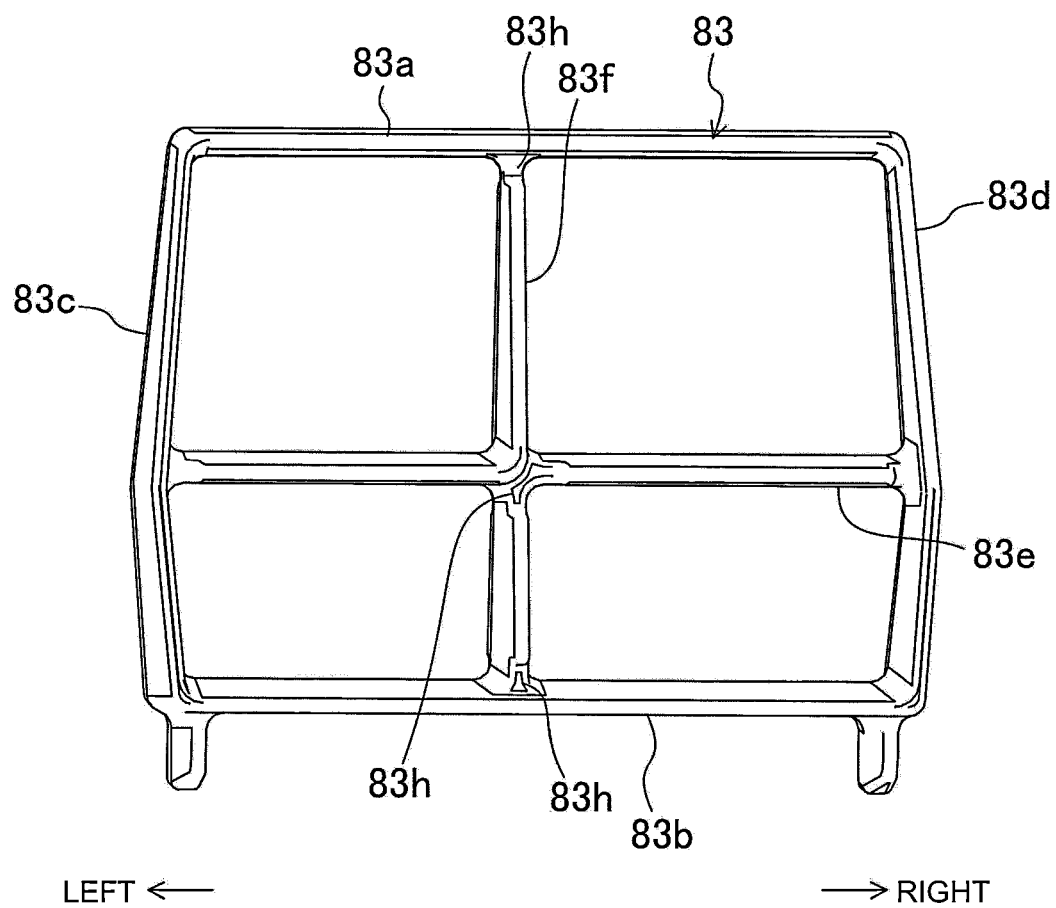
FIG. 15 is a perspective view of the connection member when viewed in another direction.
Figure 16:
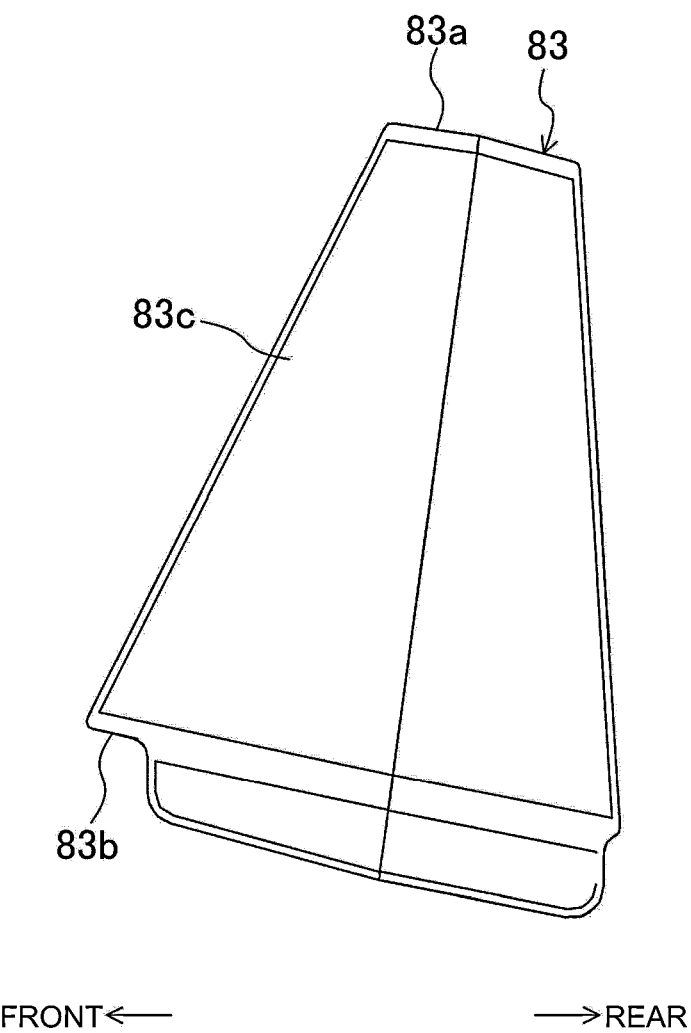
FIG. 16 is a side view of the connection member.

As illustrated in FIGS. 14 to 16, the connection member 83 has a tubular shape connecting the rear portion of the front-side frame member 81 and the front portion of the rear-side frame member 82 to allow communication therebetween, and the rear portion of the front-side frame member 81 and the front portion of the rear-side frame member 82 are connected in a state of being inserted in the connection member 83. Specifically, the connection member 83 includes an upper wall portion 83a and a lower wall portion 83b extending in the right-left direction and a left wall portion 83c and a right wall portion 83d extending in the up-down direction. The upper wall portion 83a extends from an upper portion of the left wall portion 83c to an upper portion of the right wall portion 83d, and the lower wall portion 83b extends from a lower portion of the left wall portion 83c to a lower portion of the right wall portion 83d. The dimension of the lower wall portion 83b of the connection member 83 in the front-rear direction is set to be longer than the dimension of the upper wall portion 83a in the front-rear direction. The dimensions of the left wall portion 83c and the right wall portion 83d in the front-rear direction are longer at a lower position in accordance with the difference between the dimensions of the upper wall portion 83a and the lower wall portion 83b in the front-rear direction.

A first connection wall portion 83e extending in the right-left direction from an up-down direction intermediate portion of the left wall portion 83c to an up-down direction intermediate portion of the right wall portion 83d and a second connection wall portion 83f extending from a right-left direction intermediate portion of the upper wall portion 83a to a right-left direction intermediate portion of the lower wall portion 83b are provided inside the connection member 83. The first connection wall portion 83e and the second connection wall portion 83f are integrally formed with the upper wall portion 83a, the lower wall portion 83b, the left wall portion 83c, and the right wall portion 83d.

A front-side cutout portion 83g into which the rear portion of the front-side frame member 81 is inserted is formed on the front side of the second connection wall portion 83f. A rear-side cutout portion 83h into which the front portion of the rear-side frame member 82 is inserted is formed on the rear side of the second connection wall portion 83f. When the front-side frame member 81 and the rear-side frame member 82 are connected to each other through the connection member 83, the upper-left path T11, the upper-right path T12, the lower-left path T13, and the lower-right path T14 of the front-side frame member 81 communicate with the upper-left path T11, the upper-right path T12, the lower-left path T13, and the lower-right path T14, respectively, of the rear-side frame member 82.

The bend portion 80A may be provided without the connection member 83. In this case, the bend portion 80A of the center frame 80 can be formed through bending fabrication of the center frame 80. For example, the bending fabrication may be simultaneously provided when the center frame 80 is fabricated by extrusion, or the bending fabrication may be provided after the extrusion fabrication.

Figure 17:
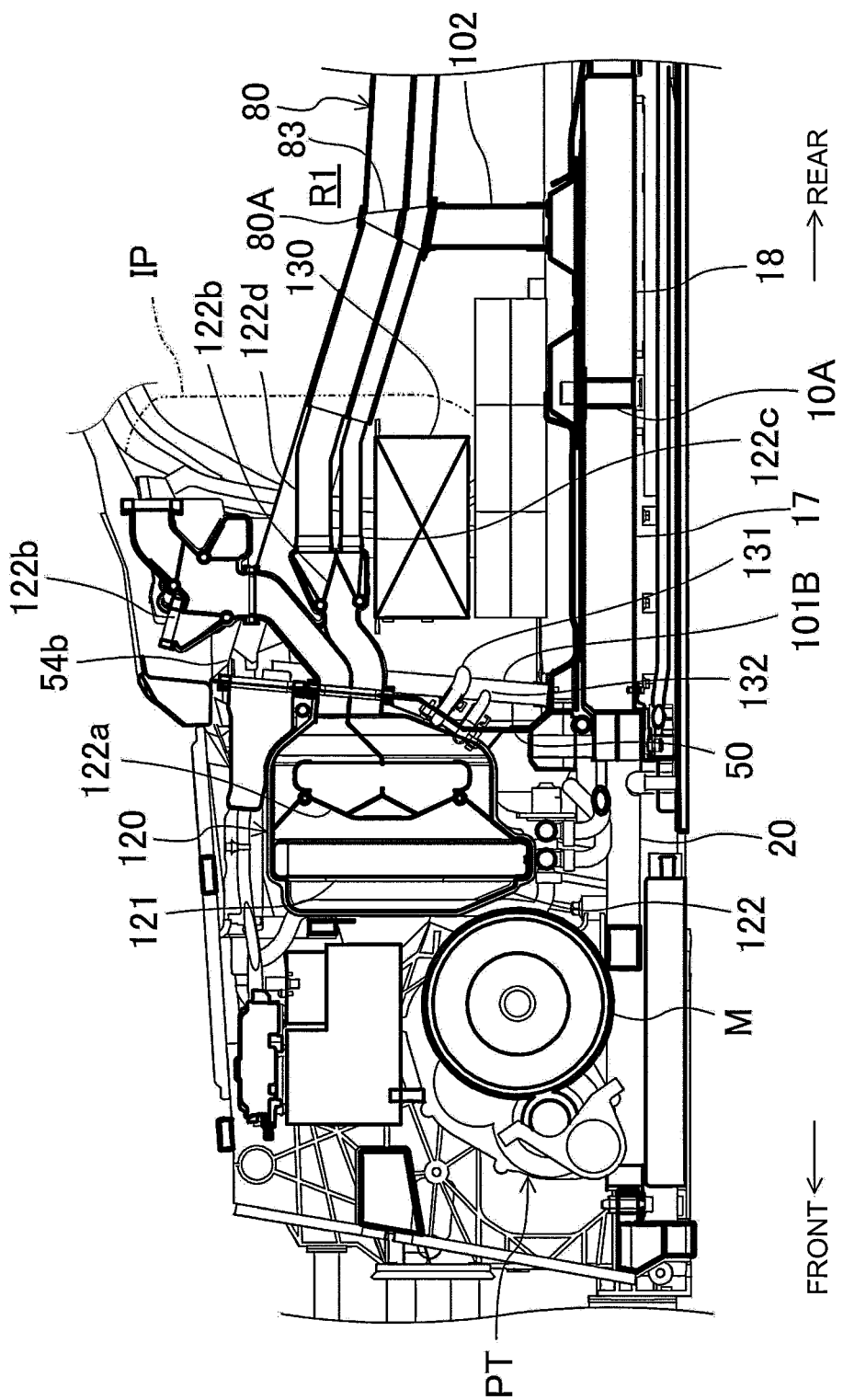
FIG. 17 is a cross-sectional diagram of an air-conditioning device and the vicinity thereof.

As illustrated in FIG. 17, the upper-portion structural body 3 includes an air-conditioning device 120 that generates air-conditioned air to be sent to the occupant space R1. The air-conditioning device 120 is disposed on the front side of a front portion of the front-side frame member 81 and positioned on the front side of the center frame 80. The air-conditioning device 120 will be described later in detail.

As illustrated in FIG. 18, the center frame 80 includes a left-side frame member 84A and a right-side frame member 84B constituting the front portion of the center frame 80, and accordingly, the front portion of the center frame 80 has a shape bifurcated in the right-left direction. The left-side frame member 84A and the right-side frame member 84B are provided at an interval from each other in the right-left direction. A rear portion of the left-side frame member 84A is fixed to a left-side surface of a front-rear direction intermediate portion of the front-side frame member 81. The left-side frame member 84A is tilted from a fixation part to the front-side frame member 81 toward the front side in a plan view such that the left-side frame member 84A is positioned farther on the left side at a position farther on the front side. A front portion of the left-side frame member 84A is connected to a part of the dash panel 50 higher than and away from the occupant-space-side floor panel 41. A rear portion of the left-side front frame 54A is connected to the front portion of the left-side frame member 84A. Specifically, as illustrated in FIG. 18, the rear portion of the left-side front frame 54A includes a left-side connection portion 54a. The left-side connection portion 54a is a member for connecting the left-side front frame 54A to the front portion of the left-side frame member 84A and is fixed to the dash panel 50. A front portion of the left-side front frame 54A extends to the left-side front-wheel suspension support member 51A and is fixed to the left-side front-wheel suspension support member 51A.

A rear portion of the right-side frame member 84B is fixed to a right-side surface of the front-rear direction intermediate portion of the front-side frame member 81. The right-side frame member 84B is tilted from a fixation part to the front-side frame member 81 toward the front side in a plan view such that the right-side frame member 84B is positioned farther on the right side at a position farther on the front side. A front portion of the right-side frame member 84B is connected to the part of the dash panel 50 higher than and away from the occupant-space-side floor panel 41. A rear portion of the right-side front frame 54B (illustrated in FIG. 4) is connected to the front portion of the right-side frame member 84B. Specifically, the rear portion of the right-side front frame 54B includes a right-side connection portion 54b as illustrated in FIG. 18. The right-side connection portion 54b is a member for connecting the right-side front frame 54B to the front portion of the right-side frame member 84B and is fixed to the dash panel 50. A front portion of the right-side front frame 54B extends to the right-side front-wheel suspension support member 51B and is fixed to the right-side front-wheel suspension support member 51B.

The upper-portion structural body 3 includes a plurality of connecting members (connecting structures) 101 to 103. The connecting members 101 to 103 are members for connecting the center frame 80 to the occupant-space-side floor panel 41, each member extending upward from the occupant-space-side floor panel 41 and having an upper portion fixed to the center frame 80. The connecting members 101 to 103 include the first connecting member 101, the second connecting member 102, and the third connecting member 103 and are each formed of, for example, an extruded material. The number of connecting members 101 to 103 is not limited to plurality but may be one.

Among the first to third connecting members 101 to 103, the first connecting member 101 is disposed farthest on the front side in the occupant space R1, and the first connecting member 101 is separated on the rear side from the dash panel 50. A lower portion of the first connecting member 101 is fixed to a site separated on the rear side from the dash panel 50 on the occupant-space-side floor panel 41, and an upper portion of the first connecting member 101 is fixed to a site separated on the rear side from the dash panel 50 on the center frame 80. Accordingly, a closed cross-section structure is constituted in a side view by the center frame 80, the first connecting member 101, the occupant-space-side floor panel 41, and the dash panel 50. Specifically, the center frame 80, the first connecting member 101, the occupant-space-side floor panel 41, and the dash panel 50 are connected to form an annular structure.

As illustrated in, for example, FIG. 3, the second connecting member 102 is separately disposed on the rear side of the first connecting member 101. The lower portion of the first connecting member 101 and a lower portion of the second connecting member 102 are fixed to sites separated from each other in the front-rear direction on the occupant-space-side floor panel 41. The upper portion of the first connecting member 101 and an upper portion of the second connecting member 102 are fixed to sites separated from each other in the front-rear direction of the center frame 80. Accordingly, a closed cross-section structure is constituted in a side view by the center frame 80, the first connecting member 101, the occupant-space-side floor panel 41, and the second connecting member 102. The third connecting member 103 is separately disposed on the rear side of the second connecting member 102.

As illustrated in FIG. 18, the first connecting member 101 includes a left-side member (left-side connecting member) 101A and a right-side member (right-side connecting member) 101B. Lower portions of the left-side member 101A and the right-side member 101B are fixed to the front-portion cross member 44A but may be directly fixed to a body part of the occupant-space-side floor panel 41. The left-side member 101A extends at a tilt in a front view such that the left-side member 101A is positioned farther on the left side at a position farther on the upper side from the front-portion cross member 44A. An upper portion of the left-side member 101A is fixed to the front portion of the left-side frame member 84A of the center frame 80. The upper portion of the left-side member 101A may be fixed to the left-side connection portion 54a. In this case, the left-side member 101A connects the left-side connection portion 54a and the occupant-space-side floor panel 41.

The right-side member 101B extends at a tilt in a front view such that the right-side member 101B is positioned farther on the right side at a position farther on the upper side from the front-portion cross member 44A. An upper portion of the right-side member 101B is fixed to the front portion of the right-side frame member 84B of the center frame 80. The upper portion of the right-side member 101B may be fixed to the right-side connection portion 54b. In this case, the right-side member 101B connects the right-side connection portion 54b and the occupant-space-side floor panel 41. Since the front portion of the left-side frame member 84A and the front portion of the right-side frame member 84B are separated from each other in the right-left direction, most parts of the left-side member 101A and the right-side member 101B except for the lower portions thereof are separated from each other in the right-left direction, and accordingly, the interval between the left-side member 101A and the right-side member 101B in the right-left direction is larger at a position farther on the upper side.

The first connecting member 101 may connect the rear portion of the left-side front frame 54A to the occupant-space-side floor panel 41. In this case, the upper portion of the left-side member 101A of the first connecting member 101 is fixed to the rear portion of the left-side front frame 54A, and the lower portion of the left-side member 101A is fixed to the occupant-space-side floor panel 41. The first connecting member 101 may connect the rear portion of the right-side front frame 54B to the occupant-space-side floor panel 41. In this case, the upper portion of the right-side member 101B of the first connecting member 101 is fixed to the rear portion of the right-side front frame 54B, and the lower portion of the right-side member 101B is fixed to the occupant-space-side floor panel 41.

The dimension of the second connecting member 102 in the right-left direction is set to be longer than the dimension thereof in the front-rear direction and equal to or smaller than the dimension of the center frame 80 in the right-left direction. Accordingly, right and left sides of the second connecting member 102 do not protrude from the center frame 80 in the right-left direction. A cross-section of the second connecting member 102 is set to be larger than a cross-section of the left-side member 101A or the right-side member 101B.

The lower portion of the second connecting member 102 is fixed between the left-side seat rails 90 and the right-side seat rails 91 at the front-portion common bracket 45 included in the intermediate cross member 44B. Specifically, the lower portion of the second connecting member 102 is fixed in a state of being inserted in the central fixation portion 45a provided at the right-left direction central portion of the front-portion common bracket 45. Thus, the common bracket 45 to which the left-side seat rails 90 and the right-side seat rails 91 are attached becomes a member having a high strength, and in addition, the dimension thereof in the vehicle width direction is long to some extent, and accordingly, a large range of fixation to a body part of the cross member 44B is obtained and fixation strength increases. When the lower portion of the second connecting member 102 is fixed to the common bracket 45 having a high strength and a high fixation strength in this manner, the strength of connection of the center frame 80 by the second connecting member 102 is further increased. Note that the lower portion of the second connecting member 102 may be directly fixed to the body part of the occupant-space-side floor panel 41 or may be directly fixed to the intermediate cross member 44B.

The upper portion of the second connecting member 102 is fixed to the bend portion 80A of the center frame 80. Specifically, the upper portion of the second connecting member 102 is fixed to the lower wall portion 83b of the connection member 83. Accordingly, the second connecting member 102 extends from the bend portion 80A of the center frame 80 toward the occupant-space-side floor panel 41. Since the dimension of the lower wall portion 83b of the connection member 83 in the front-rear direction is longer than the dimension of the upper wall portion 83a in the front-rear direction, a large area of joint to the second connecting member 102 is obtained. When the connection member 83 is omitted, the upper portion of the second connecting member 102 may be directly fixed to the center frame 80.

Similarly to the second connecting member 102, the third connecting member 103 has a cross-section that is long in the right-left direction. A lower portion of the third connecting member 103 is fixed to the recessed-portion front-side cross member 44C. An upper portion of the third connecting member 103 is fixed to the lower wall portion of the rear-side frame member 82 of the center frame 80. As illustrated in FIG. 8 as well, the third connecting member 103 is also fixed to the front portion of the floor frame 41c.

As illustrated in FIG. 4, the rear portion of the center frame 80 is connected to the connection panel 43 and the rear-portion cross member 44E. Specifically, a rear-portion connecting member 104 is fixed to the rear portion of the center frame 80, and a right-left direction central portion of the rear-portion cross member 44E is fixed to a lower portion of the rear-portion connecting member 104. The rear portion of the center frame 80 and the rear-portion cross member 44E are connected to each other through the rear-portion connecting member 104.

The rear side of the rear-portion connecting member 104 is fixed to the connection panel 43. Accordingly, the rear portion of the center frame 80 is also connected to the connection panel 43 through the rear-portion connecting member 104. The lower portion of the rear-portion connecting member 104 is also fixed to the rear portion of the occupant-space-side floor panel 41. In other words, the dash panel 50 and the connection panel 43 are connected to each other through the center frame 80. In this case, since the center frame 80 is positioned higher than and away from the occupant-space-side floor panel 41, the occupant-space-side floor panel 41, the dash panel 50, the connection panel 43, and the center frame 80 integrate and constitute a closed cross-section structure in a side view. Accordingly, the distortion stiffness of the vehicle body is sufficiently improved although the occupant-space-side floor panel 41 of a floor tunnel-less structure is included.

In addition, the front portion of the left-side rear frame 111A and the front portion of the right-side rear frame 111B are fixed to the lower portion of the rear-portion connecting member 104. Thus, the rear portion of the center frame 80 and the left-side rear-wheel suspension support member 110A are connected to each other through the left-side rear frame 111A, and the rear portion of the center frame 80 and the right-side rear-wheel suspension support member 110B are connected to each other through the right-side rear frame 111B. Accordingly, the stiffness of the rear-wheel suspension support members 110A and 110B can be increased, which improves maneuvering stability of the vehicle. In addition, the stiffness of the vehicle rear side including the connection panel 43 and the vicinity thereof is increased as well.

As illustrated in FIG. 5, the traveling motor M included in the rear-side powertrain PT is supported to each rear support frame 30 through the mounting member or the like and is disposed on the vehicle rear side of the rear portion of the center frame 80. The height of the rear-side traveling motor M can optionally set in accordance with the height of attachment to each rear support frame 30. In the present embodiment, the height of the rear-side traveling motor M is set such that the height of at least part of the range from an upper portion of the rear-side traveling motor M to a lower portion thereof is equal to the height of the rear portion of the center frame 80. In addition, the height of a rotation center of the rear-side traveling motor M, in other words, the height of an up-down direction central portion of the traveling motor M is set to be lower than that of the rear portion of the center frame 80. Since the rear-side powertrain PT is arranged in this manner, for example, a load toward the vehicle front side is applied to the rear portion of the center frame 80 when an impact load applied from the vehicle rear side is input to the traveling motor M and the traveling motor M is about to move toward the vehicle front side. In this case, since the rear portion of the center frame 80 is connected to the rear-portion cross member 44E, the connection panel 43, and the like and integrated with the occupant-space-side floor panel 41, the movement of the traveling motor M toward the front side is prevented by the center frame 80. The movement of the traveling motor M toward the front side is also prevented by the occupant-space-side floor panel 41 and the rear-portion cross member 44E.

Subsequently, a layout of the front-side powertrain PT will be described below based on FIG. 17. The front-side powertrain PT is supported to each front support frame 20 through the mounting member or the like. The height of the front-side traveling motor M can be optionally set in accordance with the height of attachment to each front support frame 20. The front-side powertrain PT is arranged on the front side of the first connecting member 101. At least part of the air-conditioning device 120 is arranged between the first connecting member 101 and the powertrain PT.

The air-conditioning device 120 includes a cooler (heat exchanger) 121 through which air-conditioned air passes, and an air conditioning casing 122 in which the cooler 121 is housed. The cooler 121 is a cooling heat exchanger including, for example, an evaporator for cooling air-conditioned air. The cooler 121 is not limited thereto, but a heating heat exchanger including a heater core or condenser configured to heat air-conditioned air may be used in place of the cooler 121, and a cooler may be disposed at another part. The cooler 121 of the present embodiment is disposed on the front side of the dash panel 50. A compressor configured to compress a coolant, an expansion valve configured to depressurize the coolant, and the like constitute part of the air-conditioning device 120.

An up-down direction central portion of the cooler 121 is arranged at a higher position than a rotation center of the front-side traveling motor M. Specifically, for example, when the automobile 1 collides on the front side and an impact load toward the rear side is applied to the powertrain PT, the powertrain PT starts retracting depending on the magnitude of the impact load. Since the front-side powertrain PT is arranged as described above, the center frame 80 extending in the front-rear direction is arranged on the rear side of the powertrain PT in a state of being connected to the occupant-space-side floor panel 41 through the connecting members 101 to 103. Accordingly, the retraction of the powertrain PT is suppressed by the center frame 80 and the connecting members 101 to 103. Since the occupant-space-side floor panel 41 is also positioned on the rear side of the powertrain PT, the retraction of the powertrain PT is suppressed by the occupant-space-side floor panel 41 as well in some cases.

Subsequently, a specific exemplary configuration of the air-conditioning device 120 will be described below. In addition to the above-described cooler 121, a heater, an air mix damper 122a for generating air-conditioned air at a desired temperature by changing the mixed ratio of cool air having passed through the cooler 121 and warm air having passed through the heater, and a vent direction switching damper 122b for distributing the generated air-conditioned air of the desired temperature to each component of a vehicle cabin are housed inside the air conditioning casing 122 of the air-conditioning device 120. Through operation of the vent direction switching dampers 122b, the air-conditioned air can be supplied to the inner surface of a front window glass FG (illustrated in FIG. 1), supplied to the upper body of a passenger, and supplied to the vicinity of the feet of a passenger. The operation of the vent direction switching damper 122b has been conventionally well known.

A front-side part of the air conditioning casing 122 is a part in which the cooler 121 and the air mix damper 122a are housed, and is arranged on the front side of the dash panel 50. A rear-side part of the air conditioning casing 122 is a part in which the vent direction switching damper 122b is housed, and is arranged in the occupant space R1 through the dash panel 50. Accordingly, the cooler 121 and the air mix damper 122a are positioned closer to the powertrain PT than the vent direction switching damper 122b. Note that the front-side part of the air conditioning casing 122 may be arranged on the rear side of the dash panel 50.

The rear-side part of the air conditioning casing 122 includes a vent portion 122c having a duct shape through which the air-conditioned air generated inside the air conditioning casing 122 is vented out. The air conditioning casing 122 also includes an air introducing duct 122d that provides communication between the vent portion 122c and the inside of the center frame 80 and through which the air-conditioned air vented out of the vent portion 122c is introduced to the inside of the center frame 80. The air introducing duct 122d is arranged at a higher position than a control device 130 to be described later and extends in the front-rear direction. A front portion of the air introducing duct 122d is connected to the vent portion 122c, and a rear portion of the air introducing duct 122d is connected to the front portion of the front-side frame member 81 of the center frame 80. Accordingly, the air-conditioned air generated by the air-conditioning device 120 is introduced to the inside of the center frame 80 through the air introducing duct 122d. The air introducing duct 122d may be a member that constitutes part of the center frame 80.

Since the center frame 80 extends in the front-rear direction, the air-conditioned air can be guided to a desired place in the front-rear direction in the occupant space R1. In this case, since the air introducing duct 122d is arranged at a higher position than the control device 130 and has a predetermined width in the right-left direction, direct sunlight is interrupted by the air introducing duct 122d as well and further unlikely to reach the control device 130. Moreover, since the center frame 80 is used as an air conditioning duct, an air conditioning duct does not need to be redundantly provided and the occupant space R1 can be enlarged as compared to a case in which an air conditioning duct is redundantly provided.

As illustrated in FIG. 18, upper-side air sending portions 80b for sending the air-conditioned air in the upper-left path T11 and the upper-right path T12 upward is provided at parts separated on the rear side from the air introducing duct 122d at an upper wall portion of the center frame 80. The upper-side air sending portions 80b are positioned on the rear side of backrest portions of the front seats FS at the upper wall portion of the center frame 80 and provided on the right and left sides, respectively. The left-side upper-side air sending portion (left-side air sending portion) 80b has a tubular shape that communicates with the inside of the upper-left path T11, and the right-side upper-side air sending portion (right-side air sending portion) 80b has a tubular shape that communicates with the inside of the upper-right path T12. Downstream ends of the upper-side air sending portions 80b are opened upward to face passengers sitting on the rear seats RS.

As illustrated in FIG. 5, lower-side air sending portions 80c for sending the air-conditioned air in the lower-left path T13 and the lower-right path T14 downward are provided at parts separated on the rear side from the air introducing duct 122d at a lower wall portion of the center frame 80. The lower-side air sending portions 80c are positioned on the rear side of seat cushion portions of the front seats FS and provided on the right and left sides, respectively, of the lower wall portion of the center frame 80. The left-side lower-side air sending portion 80c has a tubular shape that communicates with the inside of the lower-left path T13, and the right-side lower-side air sending portion 80c has a tubular shape that communicates with the inside of the lower-right path T14. Each lower-side air sending portion 80c is constituted by a rear under-feet duct extending downward toward the recessed portion 41a, and extending downward from the center frame 80 and then bending toward a vehicle-width-direction outer side. The rear under-feet duct may be referred to as a rear heat duct.

Since the center frame 80 has a cross-section that is large enough to improve the distortion stiffness of the vehicle body, air sending noise can be maintained low when the amount of the air-conditioned air circulating inside the center frame 80 is increased. In particular, since the center frame 80 extends in a substantially straight shape, a path inside the center frame 80 has a substantially straight shape as well, and air sending noise can be maintained low for this reason as well. When the center frame 80 includes no heat insulation material nor the like, heat of the air-conditioned air circulating inside the center frame 80 is transferred to a wall portion of the center frame 80 and radiated from the outer surface of the wall portion to the occupant space R1. Accordingly, it is possible to perform desirable air conditioning by using radiation heat. Note that the center frame 80 may include a heat insulation material.

(Layout of Control Device)

Figure 21:
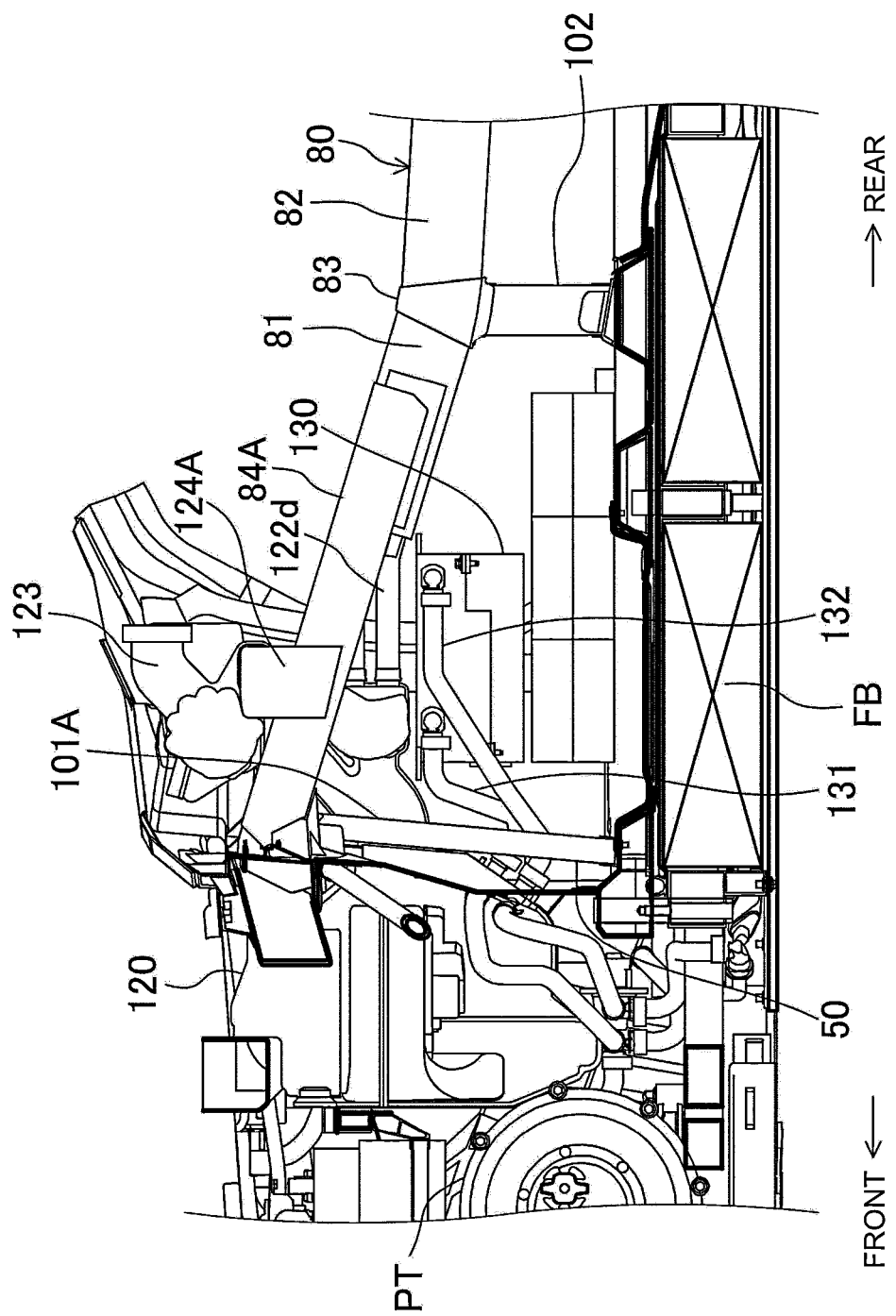
FIG. 21 is a diagram of the layout of the supply pipe and the discharge pipe for the cooling water when viewed from a left side.

The vehicle-body structure A includes the control device 130 (illustrated in, for example, FIGS. 9, 17, and 21) that controls control target units mounted on the automobile 1. Examples of the control target units include the powertrains PT, a brake device, an electric control suspension device, a lighting device, a navigation device, a head-up display device, an audio device, an in-vehicle monitor, and a television. The control device 130 that controls these control target units includes a high-performance CPU, a memory, and the like, and thus has an increased size and is weak against high heat and also weak against impact. For example, a water jacket through which cooling water circulates is provided as a heat generation measure in the control device 130. An in-vehicle entertainment function (moving image playback function or music playback function) or the like is mounted in some cases, and in such a case as well, the size of the control device 130 increases.

The control device 130 of the present embodiment is arranged at a lower position than the front portion of the center frame 80 in the occupant space R1. As described above, since the height of the front portion of the center frame 80 is higher than the rear portion of the center frame 80, even the control device 130 having a large size can be arranged. As illustrated with a virtual line in FIG. 17, an instrument panel IP to which meters and gauges are attached is arranged at a higher position than the front portion of the center frame 80. The instrument panel IP extends in the right-left direction from the left side of the occupant space R1 to the right side thereof. A front portion of the instrument panel IP reaches a lower portion of the front window glass FG (illustrated in FIG. 1).

The left-side member 101A and the right-side member 101B constituting the first connecting member 101 are arranged on the front side of the control device 130. The second connecting member 102 is arranged on the rear side of the control device 130. Accordingly, the control device 130 is arranged between the first connecting member 101 and the second connecting member 102, and gaps are provided between the first connecting member 101 and the control device 130 and between the second connecting member 102 and the control device 130, respectively.

Since the control device 130 is arranged at a lower position than the center frame 80 in the occupant space R1, for example, direct sunlight from the outside is interrupted by the center frame 80 and unlikely to reach the control device 130. Thus, the control device 130 can be arranged at a thermally advantageous place. Moreover, since the instrument panel IP is arranged at a higher position than the control device 130, direct sunlight is interrupted by the instrument panel IP as well and further unlikely to reach the control device 130. Since the control device 130 is covered by the instrument panel IP, the control device 130 is unlikely to be viewed from the outside, which is preferable in terms of security.

The air introducing duct 122d is disposed at a higher position than the control device 130. Heat of the air-conditioned air is transferred to a wall portion of the air introducing duct 122d and radiated as radiation heat from the outer surface of the wall portion toward the control device 130. In this case, since the air-conditioned air having a temperature adjusted so that the occupant space R1 becomes comfortable flows inside the air introducing duct 122d, the radiation heat from the air introducing duct 122d acts on to suppress temperature increase of the control device 130. Moreover, direct sunlight can be interrupted by the air introducing duct 122d.

For example, when a case in which an impact load is applied from the front side is assumed, at least part of the impact load is absorbed by the center frame 80 and deformation of the vehicle body in the vicinity of the center frame 80 is suppressed since the center frame 80 extends in the front-rear direction. Accordingly, the control device 130 arranged at a lower position than the center frame 80 is protected against the impact load from the front side. This is same for an impact load from the rear side. In particular, at least two places of the center frame 80 can be solidly connected to the occupant-space-side floor panel 41 through the left-side member 101A and the right-side member 101B, and thus protection performance of the control device 130 can be increased.

When a case in which an impact load is applied from a side of the vehicle is assumed, the impact load from a side is unlikely to be directly conveyed to the control device 130 since the control device 130 is arranged corresponding to the vehicle width direction central portion, and thus the control device 130 is protected against the impact load from a side as well. In addition, since the control device 130 is arranged between the first connecting member 101 and the second connecting member 102, an impact load in the front-rear direction is unlikely to be applied to the control device 130 and the protection performance further improves.

(Cooling Path)

Figure 19:
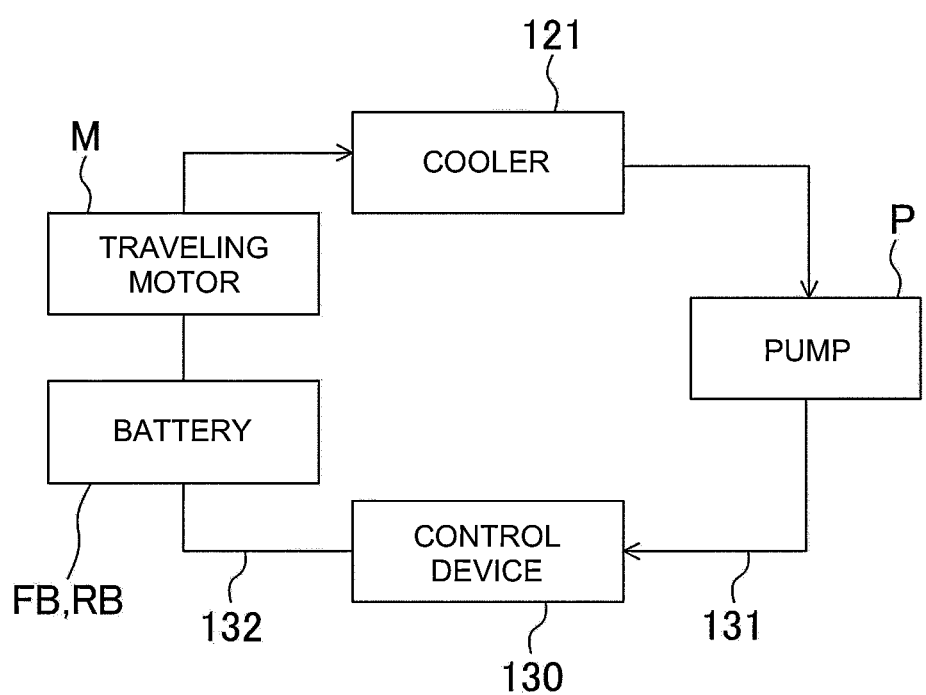
FIG. 19 is a schematic diagram of a cooling path.

Subsequently, a cooling path will be described below. FIG. 19 is a diagram illustrating a schematic structure of a cooling path provided in the automobile 1. The cooler 121 can be constituted by, for example, a cooling heat exchanger of the air-conditioning device 120, but is not limited thereto and may be a dedicated cooler provided separately from the air-conditioning device 120. A path of cooling water as a heat exchange medium is formed in the cooler 121, and the cooling water circulating through the path is cooled through heat exchange with a low-temperature coolant inside the cooler 121. The vehicle-body structure A includes a supply pipe 131 for supplying the cooling water cooled by the cooler 121 to the water jacket included in the control device 130, and a discharge pipe 132 for discharging the cooling water supplied to the control device 130. The supply pipe 131 is provided with a pump P for transferring the cooling water to the control device 130. The cooling water discharged from the discharge pipe 132 is cooled through the cooler 121 and then taken into the pump P. The control device 130 is cooled as the cooling water is circulated in this manner. The cooling water having cooled the control device 130 is used to cool the batteries FB and RB, used to cool the traveling motor M, and then returned to the cooler 121. Note that a coolant may be used in place of the cooling water.

As illustrated in FIG. 17, the cooler 121 is disposed on the rear side of the front-side powertrain PT and positioned close to the dash panel 50. Accordingly, the cooler 121 is positioned closer to the control device 130 than the front-side powertrain PT. Thus, the length of the supply pipe 131 can be short and a pipe path is simple, which leads to reduction of a pressure loss when the cooling water is supplied to the control device 130 and also leads to reduction of a cold loss between the cooler 121 and the control device 130, and accordingly, the control device 130 can be efficiently cooled.

Figure 20:
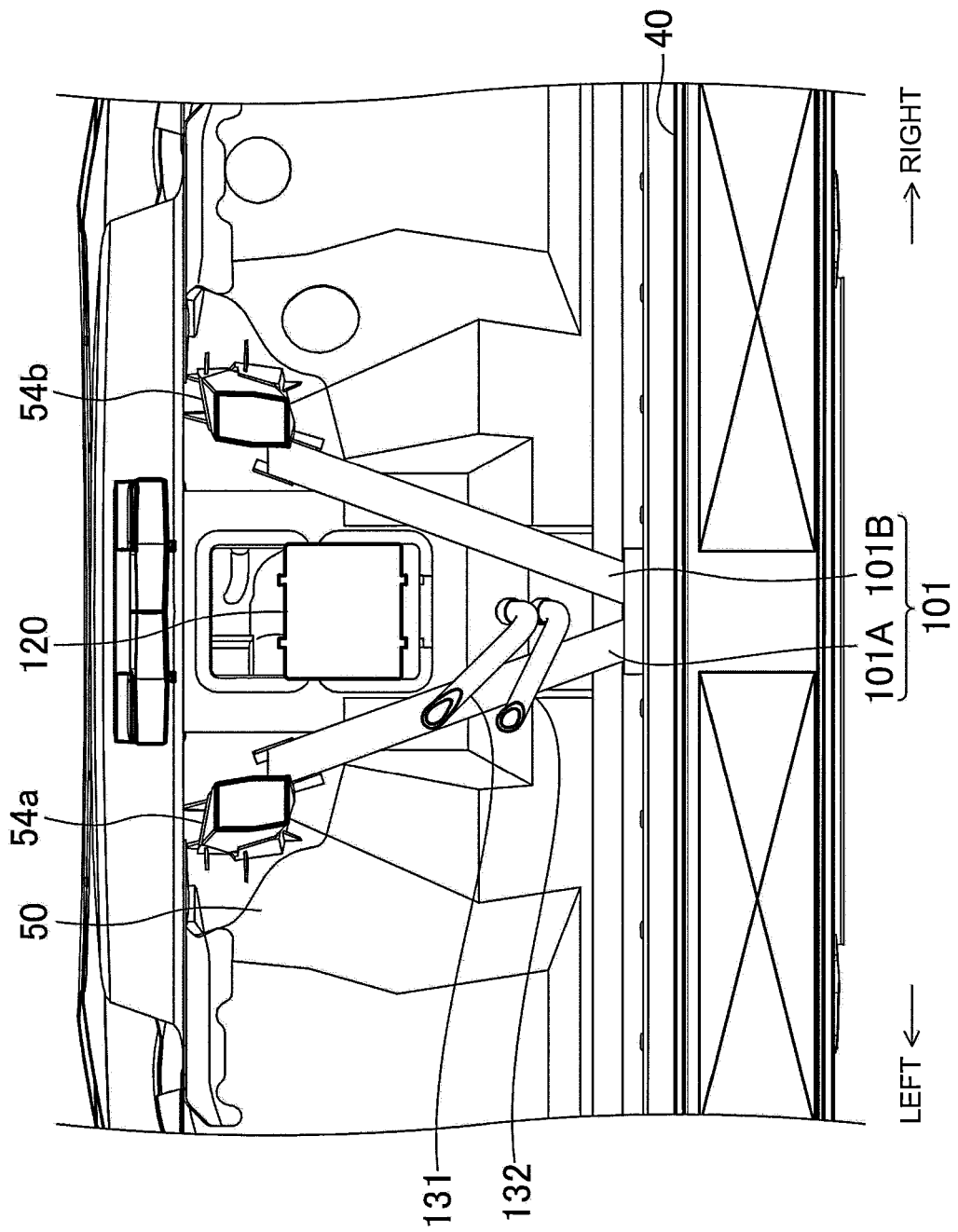
FIG. 20 is a diagram of a layout of a supply pipe and a discharge pipe for cooling water when viewed from the rear side.

As illustrated in FIG. 20, the supply pipe 131 and the discharge pipe 132 extend through the dash panel 50 and are disposed between the left-side member 101A and the right-side member 101B. Since the supply pipe 131 and the discharge pipe 132 are disposed between the left-side member 101A and the right-side member 101B, the supply pipe 131 and the discharge pipe 132 are unlikely to be hit by the feet of a passenger or the like, and damage on the supply pipe 131 and the discharge pipe 132 is suppressed. The supply pipe 131 and the discharge pipe 132 extend in the front-rear direction below the air-conditioning device 120.

(Working Effects of Embodiments)

As described above, according to the present embodiment, since the center frame 80 positioned higher than and away from the occupant-space-side floor panel 41 includes the bend portion 80A, the center frame 80 has a shape based on consideration of arrangement of various devices and the like, comfortability of passengers, and the like in the vehicle cabin. In this case, the center frame 80 is potentially more likely to deform by bending at the bend portion 80A when an impact load is input from the vehicle front side, but since the bend portion 80A of the center frame 80 is connected to the occupant-space-side floor panel 41 by the second connecting member 102, the bending of the center frame 80 can be suppressed. Accordingly, the impact load can be efficiently transferred to the vehicle rear side of the bend portion 80A of the center frame 80.

Moreover, since the center frame 80 is formed by connecting the front-side frame member 81 and the rear-side frame member 82 extending in the front-rear direction, the bend portion 80A having an optional angle based on consideration of arrangement of various devices, comfortability, and the like in the vehicle cabin can be relatively easily formed.

The present disclosure is not limited to only the above-described embodiments, which are merely exemplary. It will be appreciated by those skilled in the art that the disclosed systems and/or methods can be embodied in other specific forms without departing from the spirit of the disclosure or essential characteristics thereof. The presently disclosed embodiments are therefore considered to be illustrative and not restrictive. The disclosure is not exhaustive and should not be interpreted as limiting the claimed invention to the specific disclosed embodiments. In view of the present disclosure, one of skill in the art will understand that modifications and variations are possible in light of the above teachings or may be acquired from practicing of the disclosure.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The scope of the invention is indicated by the appended claims, rather than the foregoing description.

INDUSTRIAL APPLICABILITY

As described above, the present disclosure is applicable as, for example, a vehicle-body structure of an electric vehicle.

REFERENCE SIGNS LIST 1 automobile
41 occupant-space-side floor panel
43 connection panel
44A front-portion cross member
50 dash panel
80 center frame
101 first connecting member
102 second connecting member
A vehicle-body structure
R1 occupant space
R3 trunk space

The invention claimed is:

1. An electric-vehicle-body structure provided in an electric vehicle including a traveling motor and a battery section that supplies electric power to the traveling motor, the electric-vehicle-body structure comprising:
    a floor panel constituting a floor of an occupant space including a seat on which a passenger sits;
    a center frame disposed to be higher than and away from the floor panel at a vehicle-width-direction central portion of the occupant space, extending in a vehicle front-rear direction, and including, at a vehicle-front-rear-direction intermediate portion, a bend portion that bends in an up-down direction; and
    a connecting structure extending from the bend portion toward the floor panel, having a lower portion fixed to the floor panel, and connecting the bend portion to the floor panel, wherein
    the center frame includes a front-side frame structure extending in the vehicle front-rear direction, and a rear-side frame structure disposed on a vehicle rear side of the front-side frame structure and extending toward a vehicle rear side at a tilt angle different from a tilt angle of the front-side frame structure,
    the bend portion is constituted by a connection part between the front-side frame structure and the rear-side frame structure,
    the center frame includes a connection structure connecting a rear portion of the front-side frame structure and a front portion of the rear-side frame structure,
    an upper portion of the connecting structure is fixed to the connection structure,
    the front-side frame structure and the rear-side frame structure have tubular shapes extending in the vehicle front-rear direction, and
    the connection structure has a tubular shape connecting the rear portion of the front-side frame structure and the front portion of the rear-side frame structure to allow communication between the portions.

2. The electric-vehicle-body structure according to claim 1, wherein the rear portion of the front-side frame structure and the front portion of the rear-side frame structure are connected in a state of being inserted in the connection structure.

3. The electric-vehicle-body structure according to claim 2, wherein
the bend portion bends downward,
the connection structure includes an upper wall portion and a lower wall portion extending in a vehicle width direction,
a dimension of the lower wall portion of the connection structure in the vehicle front-rear direction is set to be longer than a dimension of the upper wall portion of the connection structure in the vehicle front-rear direction, and
the upper portion of the connecting structure is fixed to the lower wall portion of the connection structure.

4. The electric-vehicle-body structure according to claim 3, further comprising an air-conditioning device that generates air-conditioned air, wherein
the air-conditioned air generated by the air-conditioning device is introduced to the front-side frame structure, and
the rear-side frame structure is provided with a vent portion for air-conditioned air circulating inside the rear-side frame structure.

5. The electric-vehicle-body structure according to claim 1, further comprising an air-conditioning device that generates air-conditioned air, wherein
the air-conditioned air generated by the air-conditioning device is introduced to the front-side frame structure, and
the rear-side frame structure is provided with a vent portion for air-conditioned air circulating inside the rear-side frame structure.

6. The electric-vehicle-body structure according to claim 2, further comprising an air-conditioning device that generates air-conditioned air, wherein
the air-conditioned air generated by the air-conditioning device is introduced to the front-side frame structure, and
the rear-side frame structure is provided with a vent portion for air-conditioned air circulating inside the rear-side frame structure.

* * * * *